(12) United States Patent
Solheid et al.

(10) Patent No.: US 9,036,975 B2
(45) Date of Patent: May 19, 2015

(54) FIBER OPTIC CABLE PASS-THRU FITTING

(75) Inventors: James Solheid, Lakeville, MN (US);
Oscar Fernando Bran De Leon, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 728 days.

(21) Appl. No.: 13/203,023

(22) PCT Filed: Feb. 23, 2010

(86) PCT No.: PCT/US2010/000544
§ 371 (c)(1),
(2), (4) Date: Dec. 6, 2011

(87) PCT Pub. No.: WO2010/098844
PCT Pub. Date: Sep. 2, 2010

(65) Prior Publication Data
US 2012/0106914 A1 May 3, 2012

Related U.S. Application Data

(60) Provisional application No. 61/155,099, filed on Feb. 24, 2009, provisional application No. 61/157,119, filed on Mar. 3, 2009.

(51) Int. Cl.
*G02B 6/00* (2006.01)
*G02B 6/42* (2006.01)
*G02B 6/44* (2006.01)

(52) U.S. Cl.
CPC ............ *G02B 6/4248* (2013.01); *G02B 6/4446* (2013.01); *G02B 6/4471* (2013.01)

(58) Field of Classification Search
USPC ........ 385/70–71, 81, 100, 103, 113, 134–139
See application file for complete search history.

(56) References Cited

U.S. PATENT DOCUMENTS

| 4,715,251 A | 12/1987 | Margolin et al. |
| 4,863,235 A | 9/1989 | Anderson et al. |

(Continued)

FOREIGN PATENT DOCUMENTS

| EP | 0 130 513 | 1/1985 |
| JP | 57-048706 | 3/1982 |
| WO | WO 2005/006049 | 1/2005 |

OTHER PUBLICATIONS

International Search Report from International Application No. PCT/US2010/000544 mailed Aug. 31, 2010.

(Continued)

*Primary Examiner* — Akm Enayet Ullah
*Assistant Examiner* — Michael Mooney
(74) *Attorney, Agent, or Firm* — Merchant & Gould P.C.

(57) ABSTRACT

A cable pass-thru assembly includes a fiber optic cable and a cable pass-thru fitting. The fiber optic cable includes an optical fiber and a strength member. The cable pass-thru fitting is adapted to receive at least a portion of the fiber optic cable. The cable pass-thru fitting includes a housing assembly and an insert assembly. The housing assembly defines a bore. The insert assembly is adapted for engagement with the housing assembly. At least a portion of the insert assembly is disposed in the bore of the housing assembly. The insert assembly includes a nozzle and a retention member. The nozzle defines a cable passage through which the optical fiber of the fiber optic cable passes. The retention member is engaged with the nozzle so that the strength member is captured between the nozzle and the retention member.

20 Claims, 25 Drawing Sheets

(56) References Cited

U.S. PATENT DOCUMENTS

| | | |
|---|---|---|
| 5,013,122 A | 5/1991 | Savitsky et al. |
| 5,166,997 A | 11/1992 | Norland et al. |
| 5,644,673 A * | 7/1997 | Patterson .................... 385/138 |
| 6,487,343 B1 | 11/2002 | Lewandowski et al. |
| 6,672,894 B2 | 1/2004 | Sprunger |
| 7,146,090 B2 | 12/2006 | Vo et al. |
| 7,751,675 B2 | 7/2010 | Holmberg et al. |
| 2007/0127875 A1 | 6/2007 | Allen et al. |
| 2008/0124031 A1 | 5/2008 | Scadden et al. |
| 2009/0238531 A1 | 9/2009 | Holmberg et al. |
| 2010/0086260 A1 * | 4/2010 | Parikh et al. .................... 385/76 |
| 2010/0189404 A1 | 7/2010 | Rudenick et al. |
| 2010/0290746 A1 | 11/2010 | Bran de Leon et al. |
| 2012/0087628 A1 | 4/2012 | Bran de Leon et al. |

OTHER PUBLICATIONS

International Search Report and Written Opinion in Application PCT/US2010/000544, mailed Aug. 31, 2010, 6 pgs.

* cited by examiner

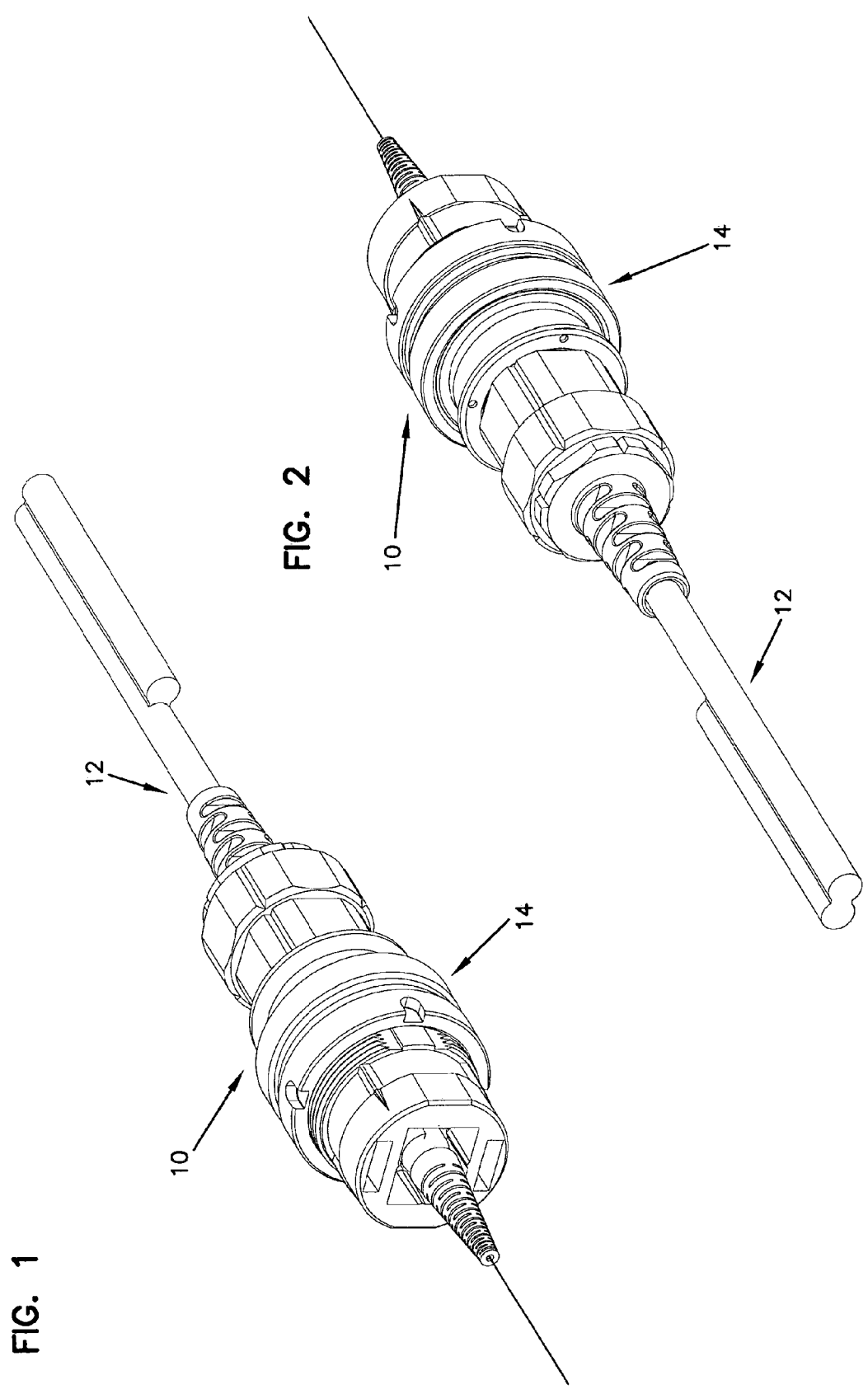

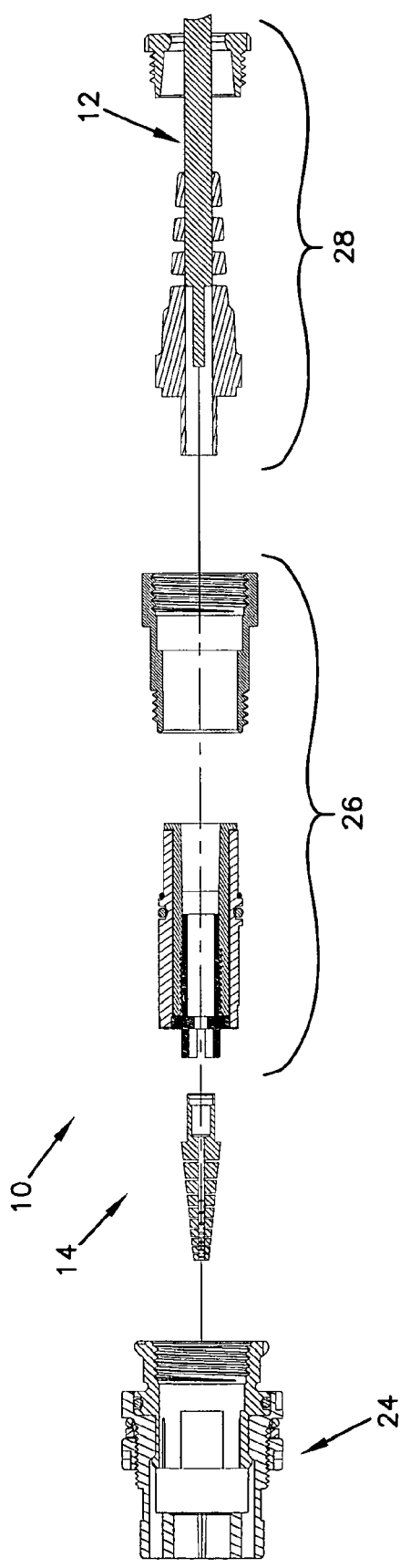
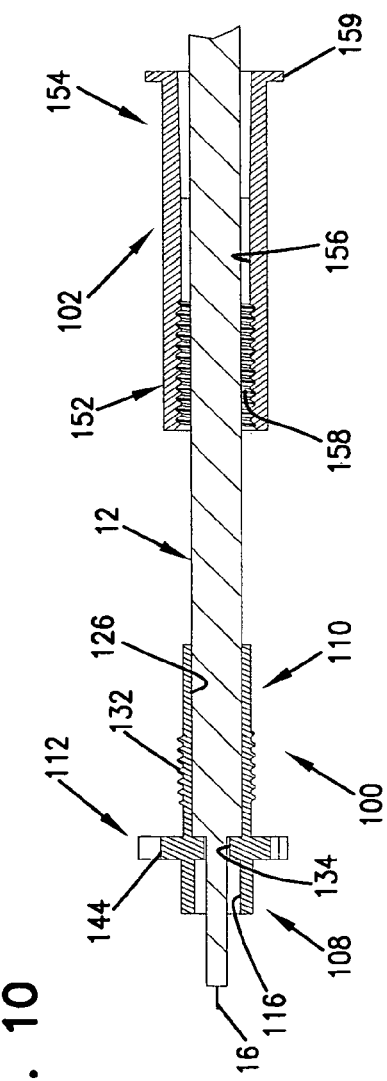
FIG. 6
FIG. 10

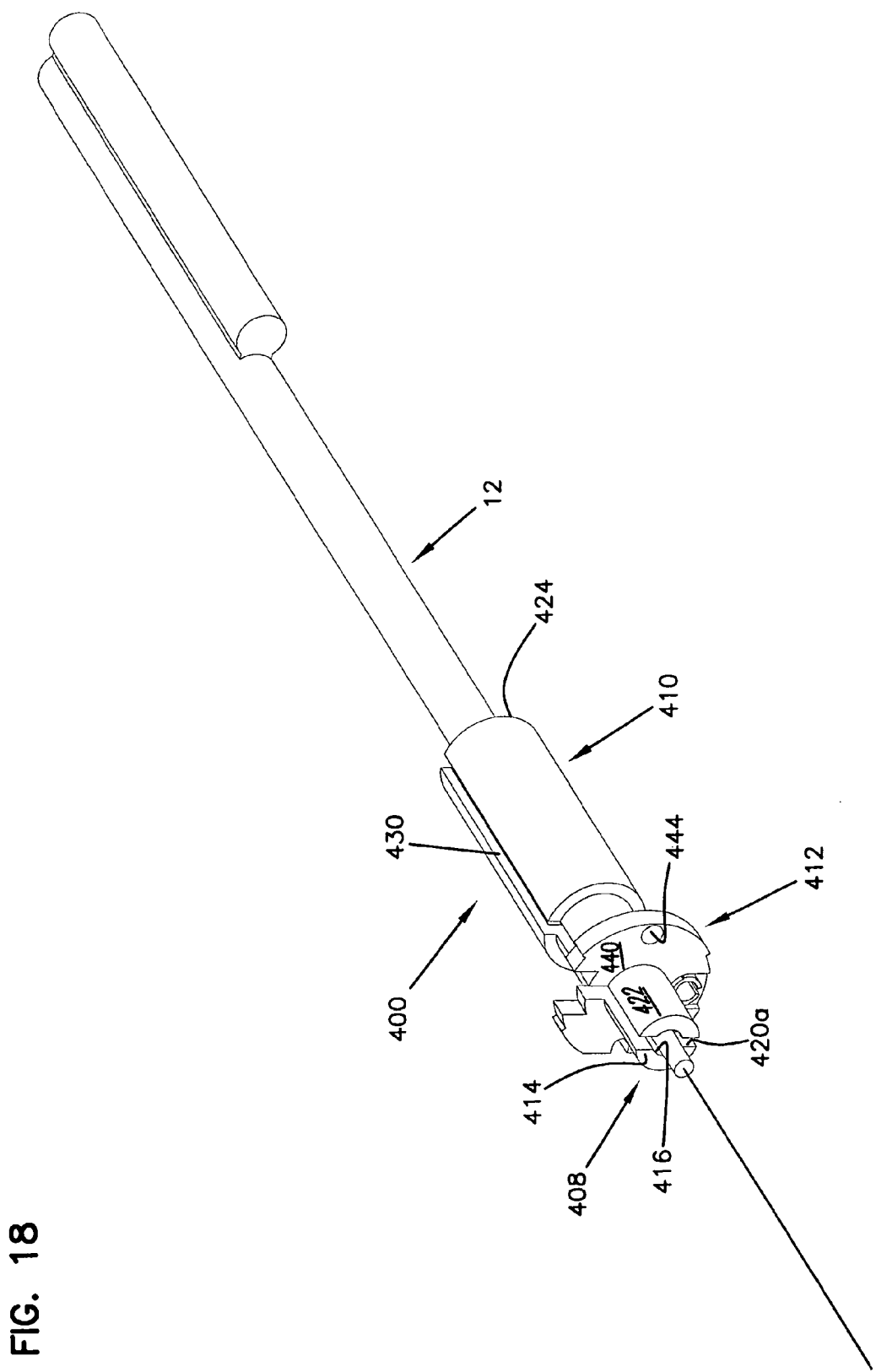

FIBER OPTIC CABLE PASS-THRU FITTING

CROSS-REFERENCE TO RELATED APPLICATIONS

This application is being filed on 24 Aug. 2011, as a US National Stage of PCT International Patent application No. PCT/US2010/000544, filed 23 Feb. 2010 in the name of ADC Telecommunications, Inc., a U.S. national corporation, applicant for the designation of all countries except the U.S., and Oscar Fernando Bran de Léon, a citizen of the U.S., and James J. Solheid, a citizen of the U.S., applicants for the designation of the U.S. only, and claims priority to U.S. Provisional Patent Application Ser. No. 61/155,099 filed on 24 Feb. 2009 and U.S. Provisional Patent Application Ser. No. 61/157,119 filed on 3 Mar. 2009. To the extent appropriate, a claim of priority is made to each of the above disclosed applications.

BACKGROUND

Fiber optic enclosures can be used in fiber optic networks to provide an access location for subscribers to a main fiber optic cable. These fiber optic enclosures typically include connection ports at which fiber optic connectors of a subscriber cable can be engaged to established fiber optic connectivity for a given subscriber location.

In some instances, however, the subscriber cable does not include fiber optic connectors. In some instances, the subscriber cable is spliced to the fiber optic cables within the fiber optic enclosure. Therefore, it is desirable to have a fitting that can mount to the fiber optic enclosure at the connection ports and allow the subscriber cable to pass through the fitting to the interior of the fiber optic enclosure.

SUMMARY

An aspect of the present disclosure relates to a cable pass-thru assembly. The cable pass-thru assembly includes a cable pass-thru fitting that is adapted to secure a portion of a strength member of a fiber optic cable to the cable pass-thru fitting as an optical fiber of the fiber optic cable passes through the cable pass-thru fitting.

An aspect of the present disclosure relates to a cable pass-thru assembly. The cable pass-thru assembly includes a fiber optic cable and a cable pass-thru fitting. The fiber optic cable includes an optical fiber and a strength member. The cable pass-thru fitting is adapted to receive at least a portion of the fiber optic cable. The cable pass-thru fitting includes a housing assembly and an insert assembly. The housing assembly defines a bore. The insert assembly is adapted for engagement with the housing assembly. At least a portion of the insert assembly is disposed in the bore of the housing assembly. The insert assembly includes a nozzle and a retention member. The nozzle defines a cable passage through which the optical fiber of the fiber optic cable passes. The retention member is engaged with the nozzle so that the strength member is captured between the nozzle and the retention member.

An aspect of the present disclosure relates to a cable pass-thru assembly. The cable pass-thru assembly includes a fiber optic cable and a cable pass-thru fitting. The fiber optic cable includes an optical fiber and a strength member. The cable pass-thru fitting is adapted to receive at least a portion of the fiber optic cable. The cable pass-thru fitting includes a housing assembly and an insert assembly. The housing assembly defines a bore. The insert assembly is adapted for engagement with the housing assembly. At least a portion of the insert assembly is disposed in the bore of the housing assembly. The insert assembly includes a nozzle and a retention member. The nozzle defines a cable passage through which the optical fiber of the fiber optic cable passes. The nozzle includes a first axial end and a collar that extends radially outward from the first axial end. The collar defines a retention opening. The retention member is engaged with the nozzle at the retention opening. The strength member is retained by the retention member.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 is a perspective view of a cable pass-thru assembly having exemplary features of aspects in accordance with the principles of the present disclosure.

FIG. 2 is a rear perspective view of the cable pass-thru assembly of FIG. 1.

FIG. 6 is an exploded cross-sectional view of the cable pass-thru assembly of FIG. 1.

FIG. 10 is a cross-sectional view of the nozzle and inner sleeve of FIG. 9.

Figure 14:
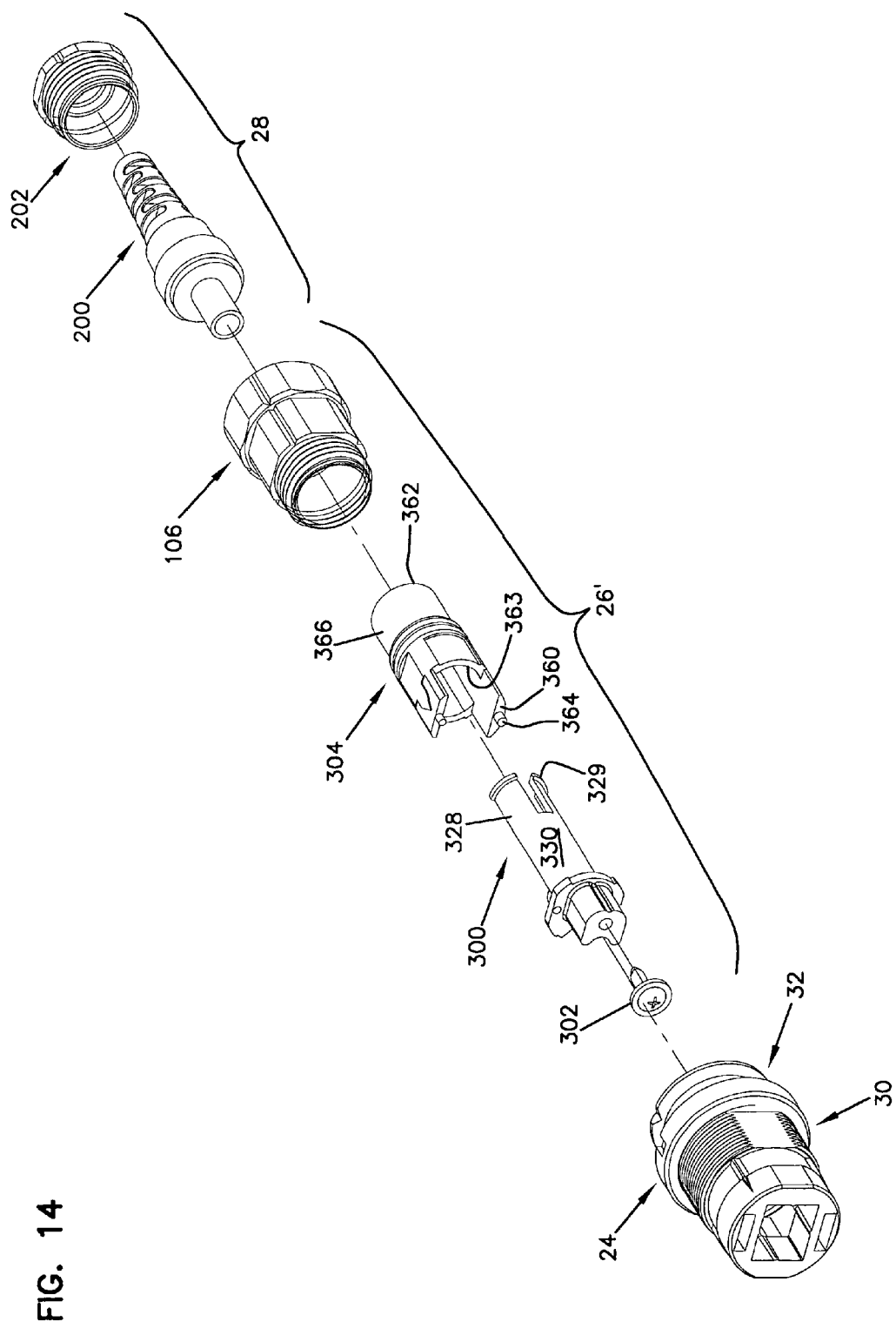
FIG. 14 is an exploded view of a cable pass-thru fitting suitable for use with the cable pass-thru assembly of FIG. 12.
Figure 15:
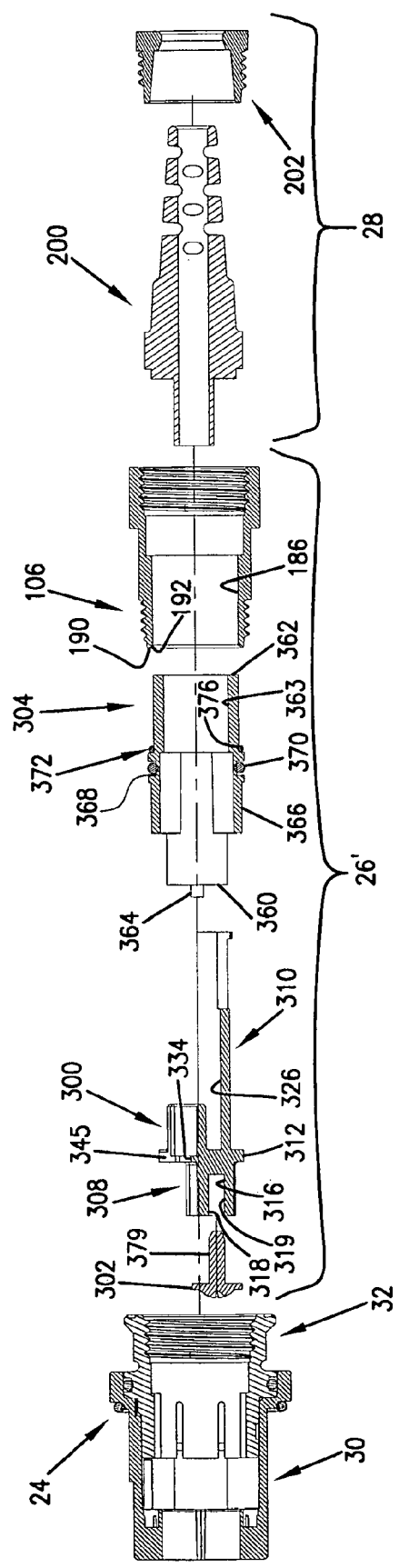

FIG. 15 a cross-sectional exploded view of the cable pass-thru fitting of FIG. 14.

Figure 12:
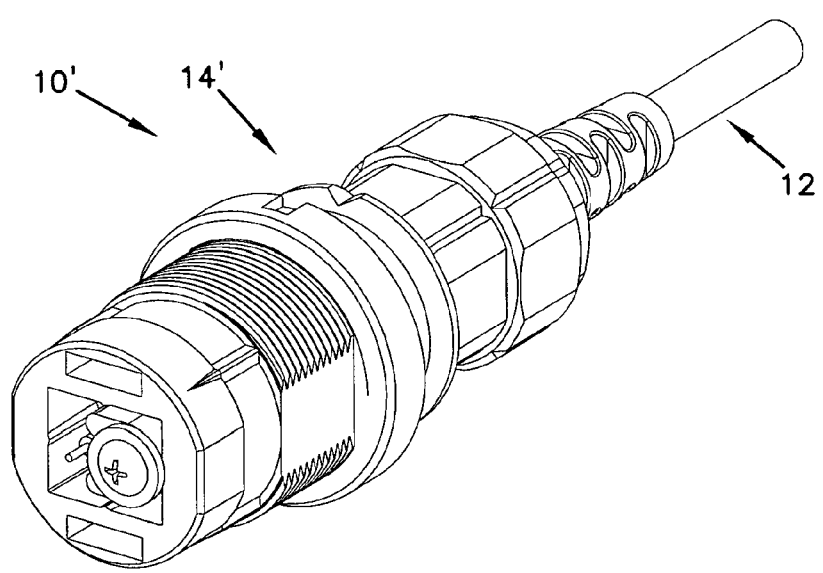
FIG. 12 is a perspective view of an alternate embodiment of a cable pass-thru assembly having exemplary features of aspects in accordance with the principles of the present disclosure.
Figure 16:
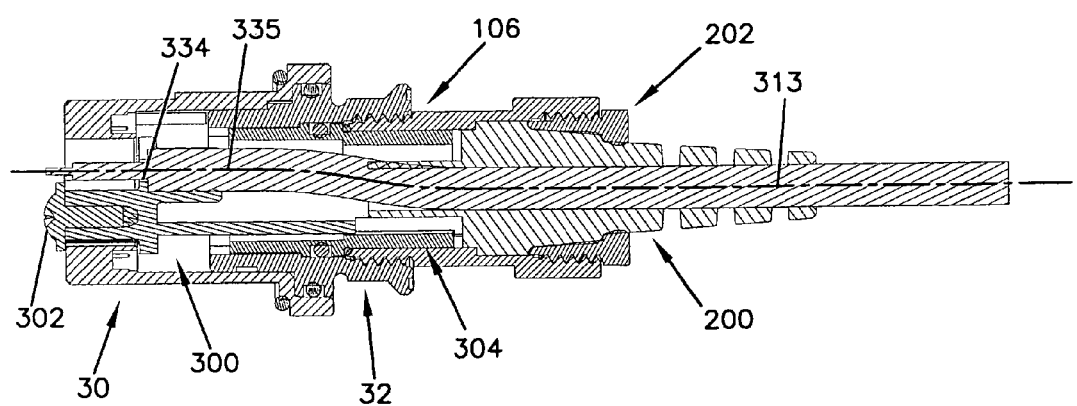

FIG. 16 is a cross-sectional view of the cable pass-thru assembly of FIG. 12.

Figure 17:
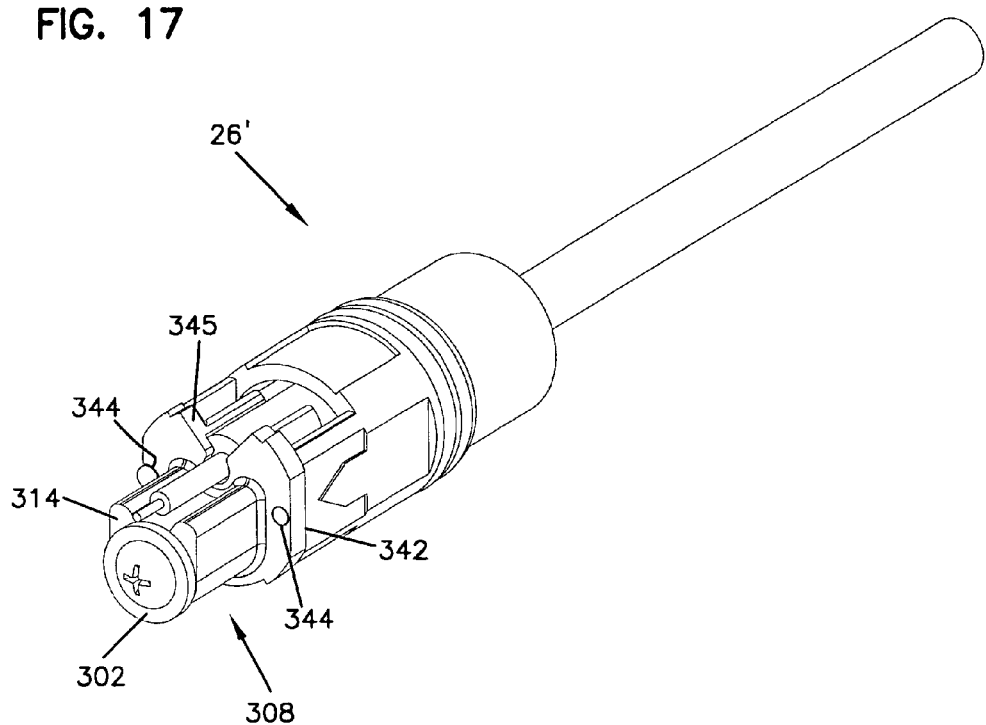

FIG. 17 is a perspective view of an insert assembly suitable for use with the cable pass-thru assembly of FIG. 12.

FIG. 18 is a perspective view of an alternate embodiment of a nozzle that is suitable for use with the cable pass-thru assembly of FIG. 1.

Figure 19:
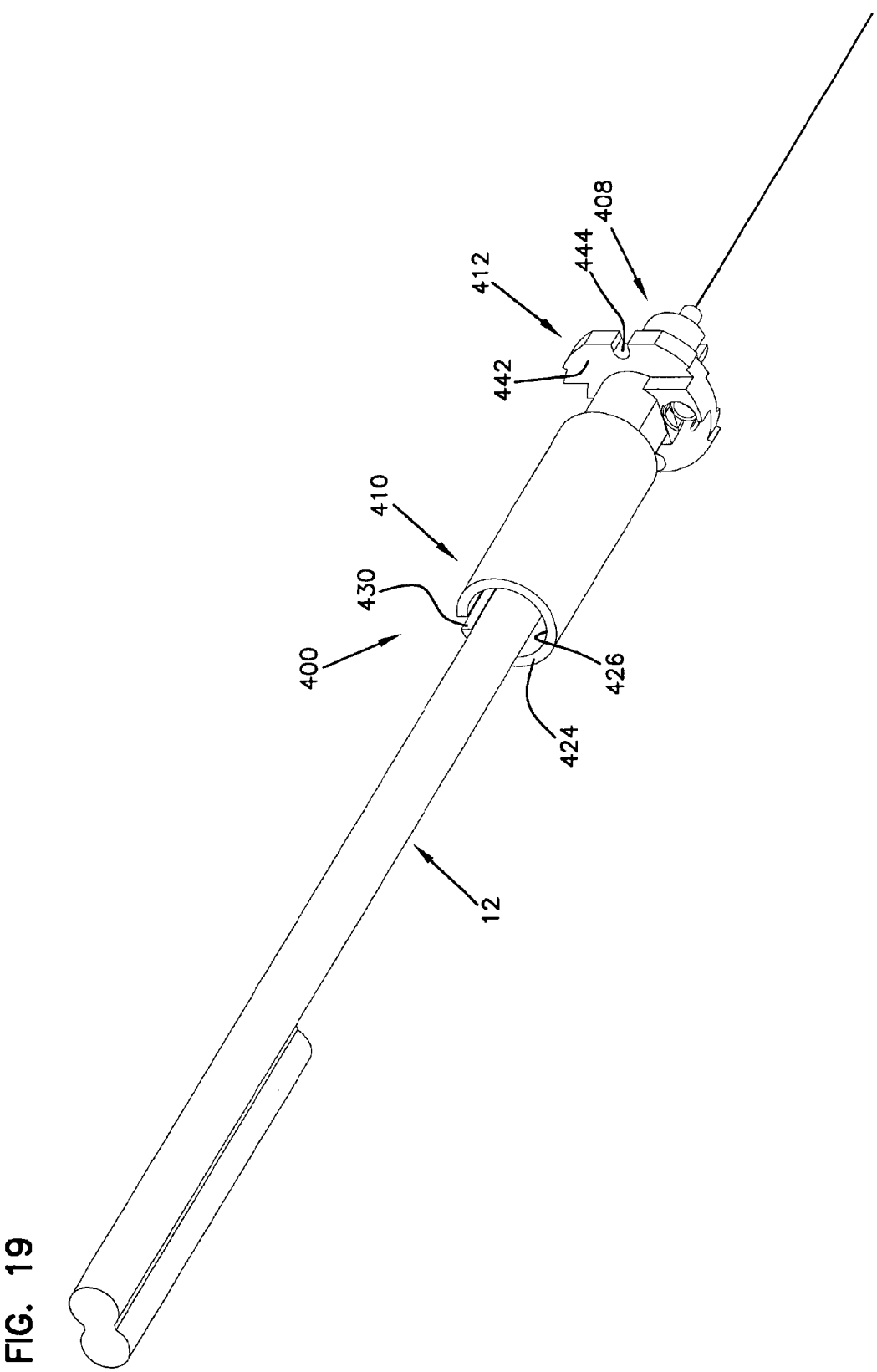

FIG. 19 is a rear perspective view of the nozzle of FIG. 18.

Figure 20:
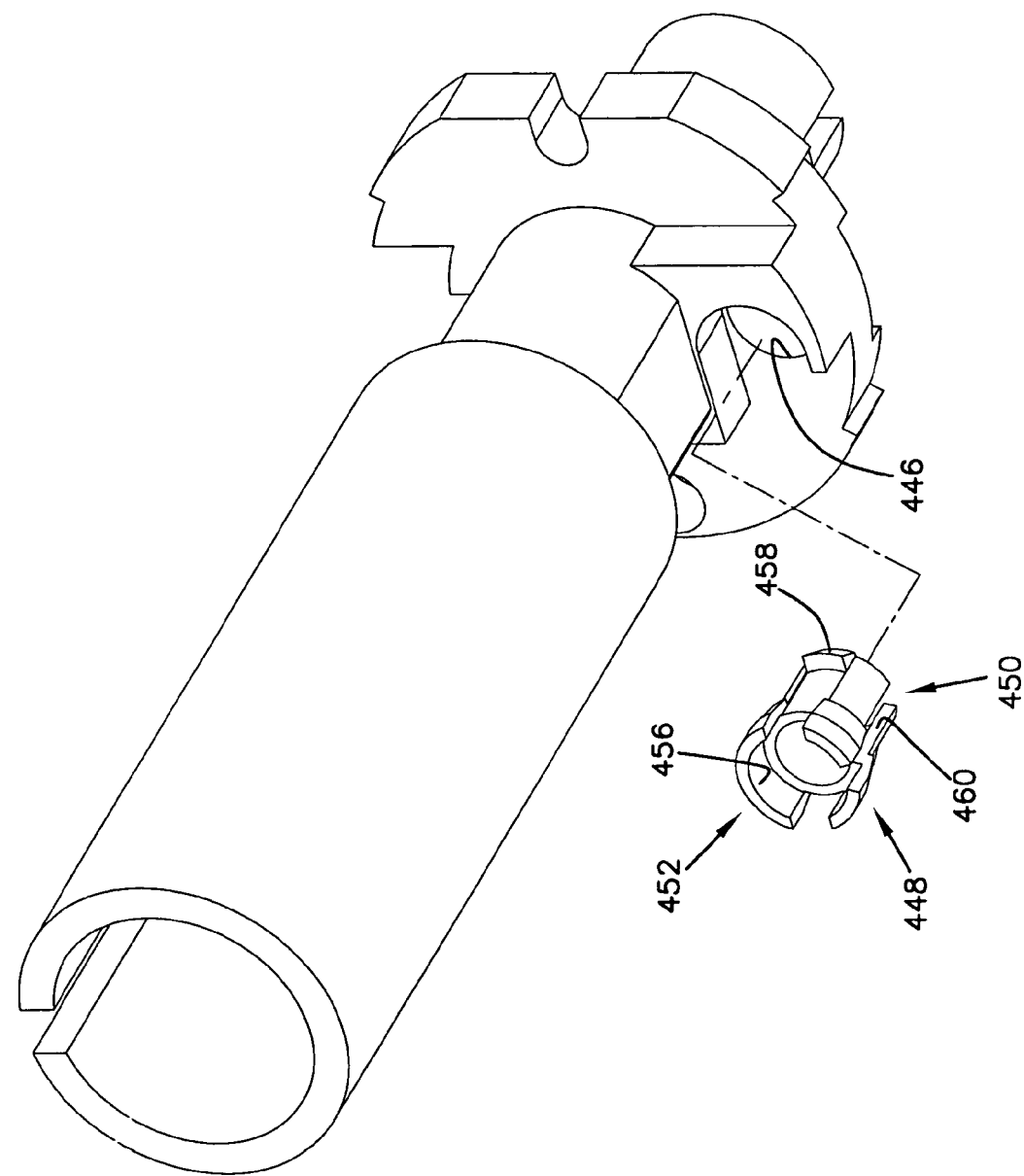

FIG. 20 is an exploded perspective view of the nozzle of FIG. 19.

Figure 21:
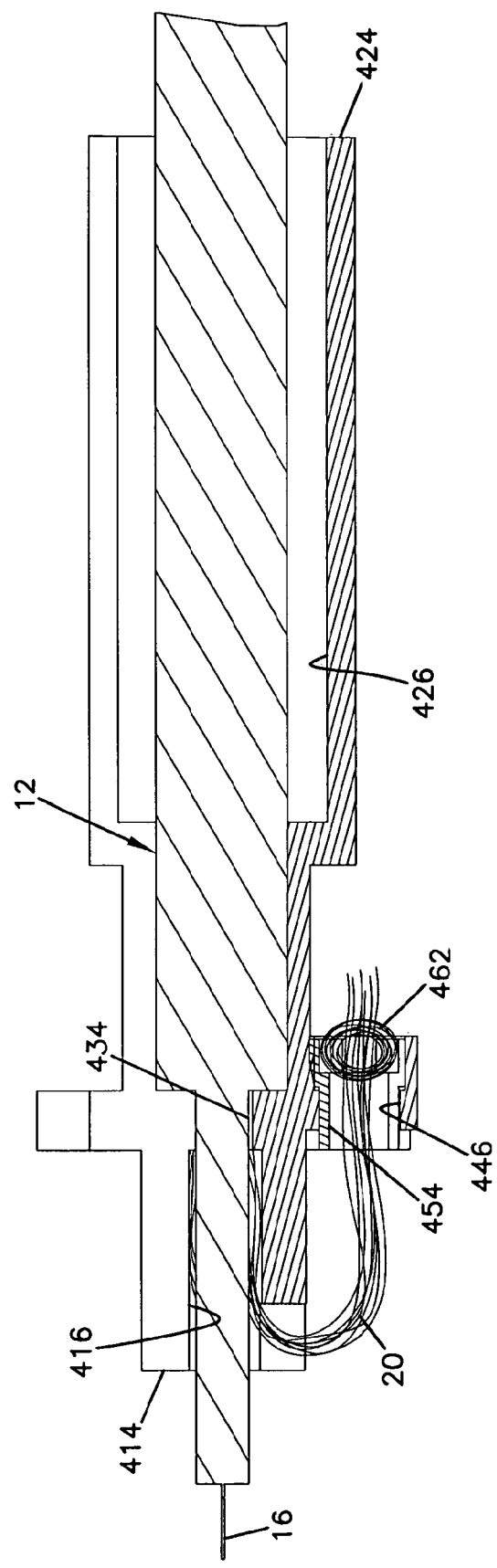

FIG. 21 is a cross-sectional view of the nozzle of FIG. 18.

Figure 22:
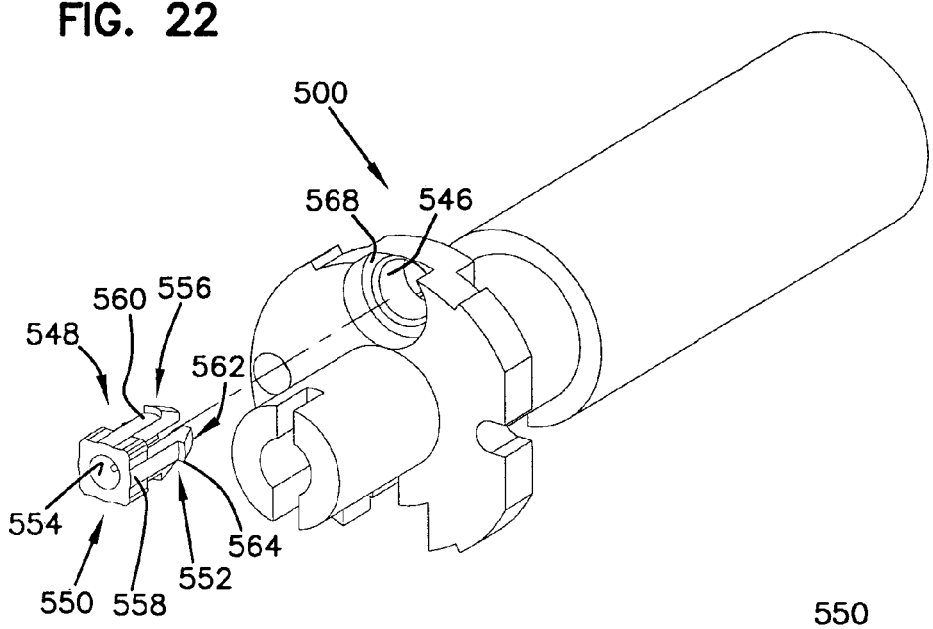

FIG. 22 is a perspective view of an alternate embodiment of a nozzle that is suitable for use with the cable pass-thru assembly of FIG. 1.

Figure 23:
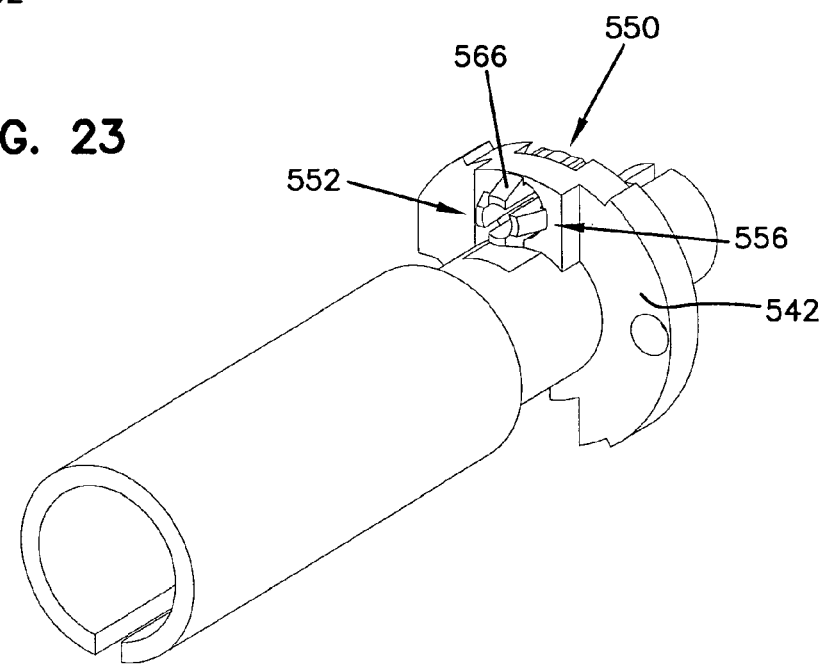

FIG. 23 is a rear perspective view of the nozzle of FIG. 22.

Figure 24:
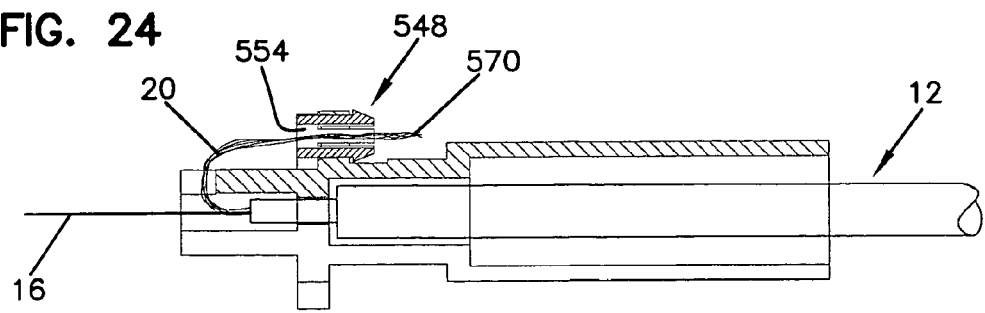

FIG. 24 is a cross-sectional view of the nozzle of FIG. 22.

Figure 25:
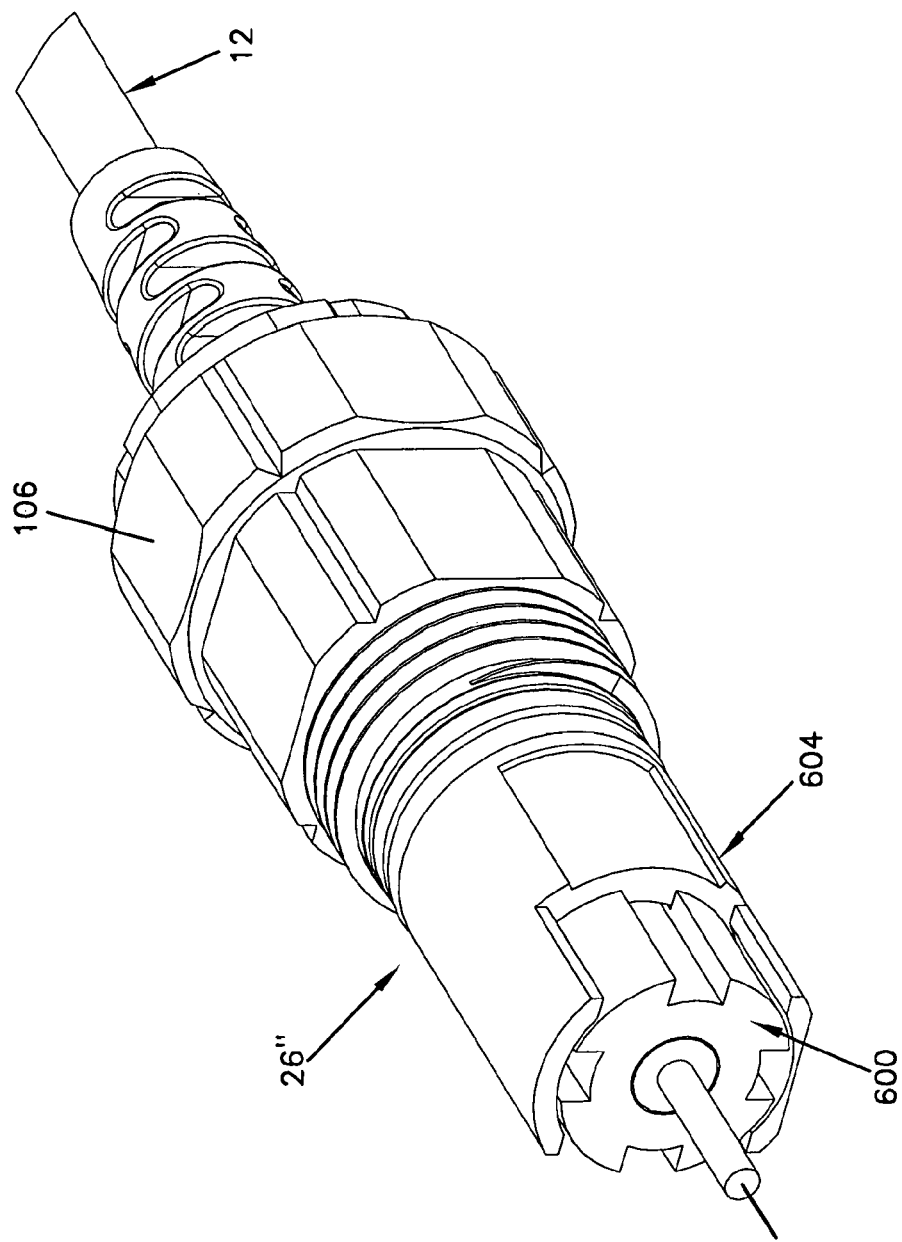

FIG. 25 is a perspective view of an alternate embodiment of an insert assembly suitable for use with the cable pass-thru assembly.

Figure 26:
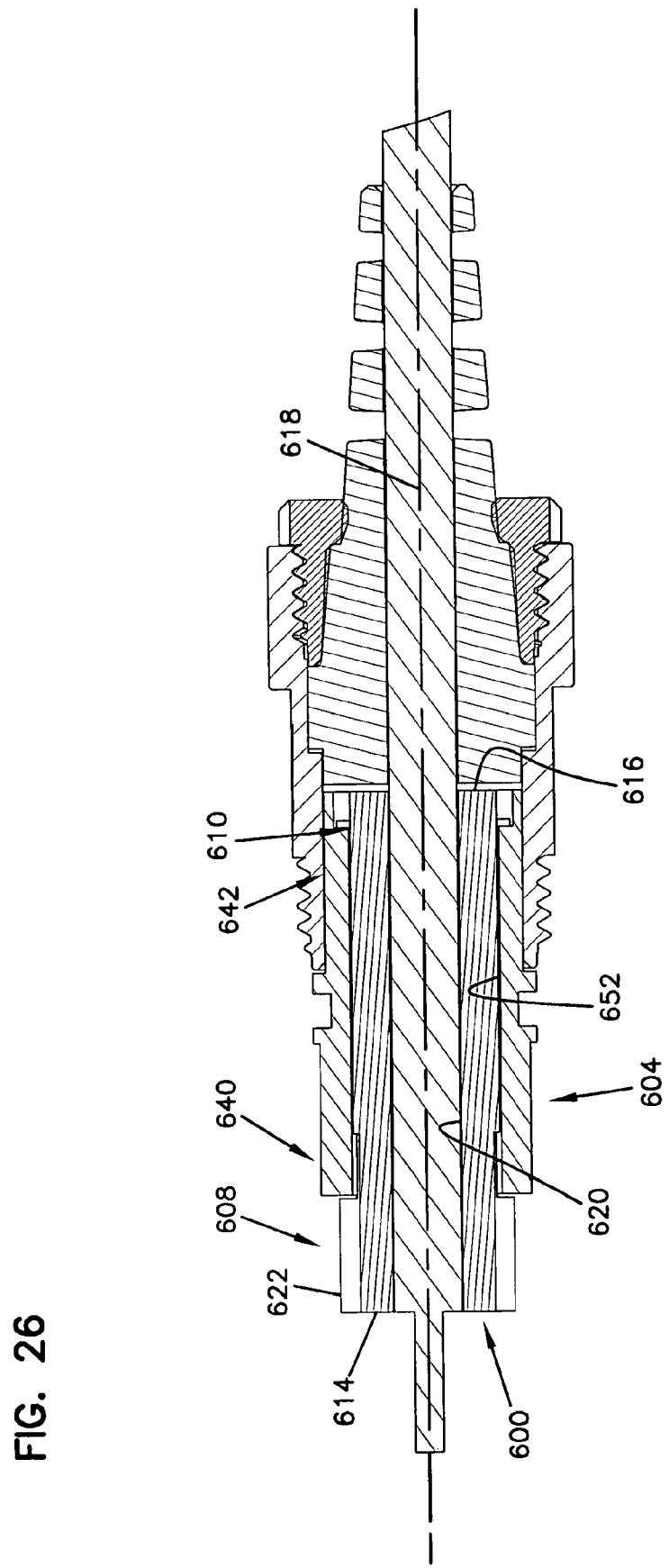

FIG. 26 is a cross-sectional view of the cable pass-thru assembly of FIG. 25.

Figure 27:
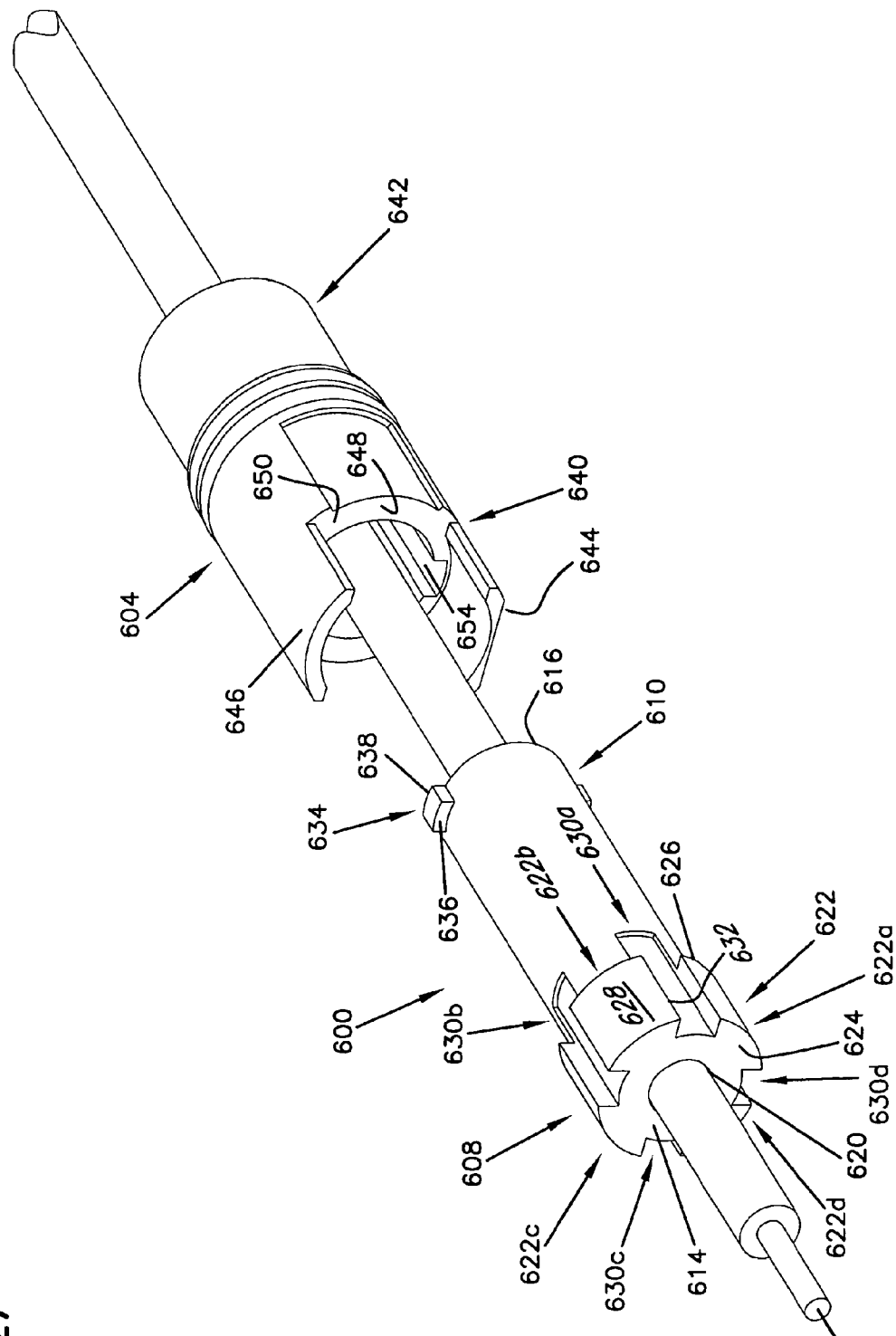

FIG. 27 is an exploded view of the insert assembly of FIG. 25.

Figure 28:
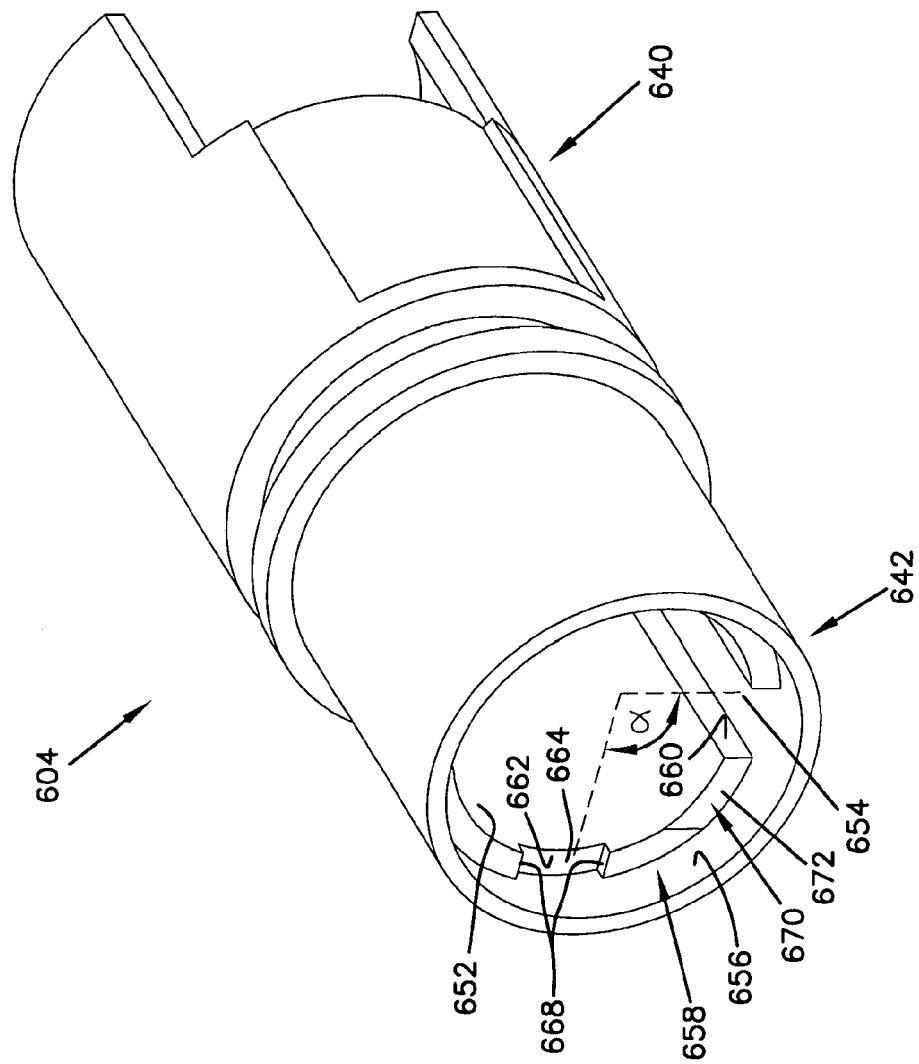

FIG. 28 is a rear perspective view of a sleeve of the insert assembly of FIG. 27.

Figure 29:
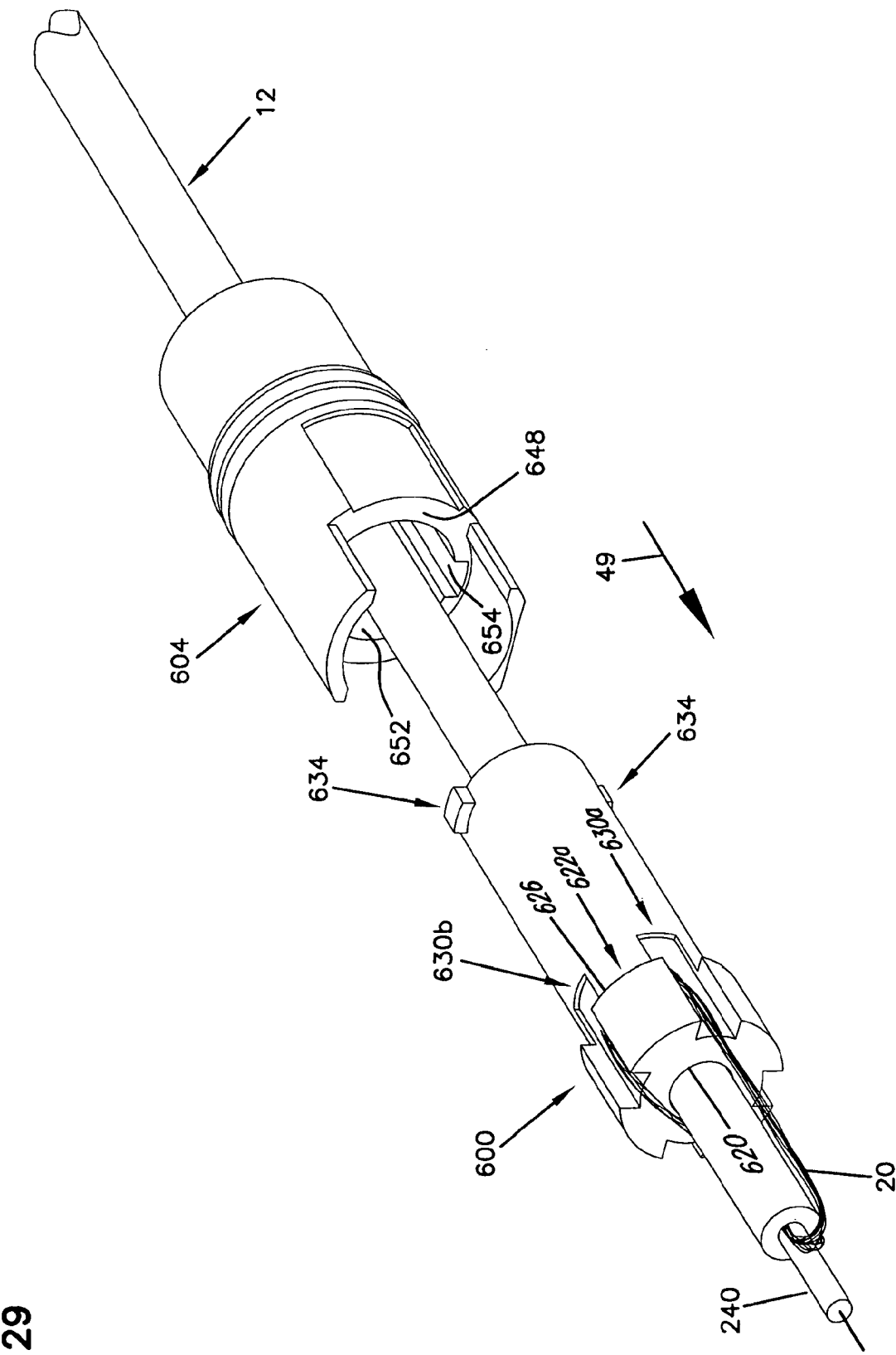

FIG. 29 is an exploded view of the insert assembly of FIG. 25 showing a routing scheme for a strength member of a fiber optic cable.

Figure 30:
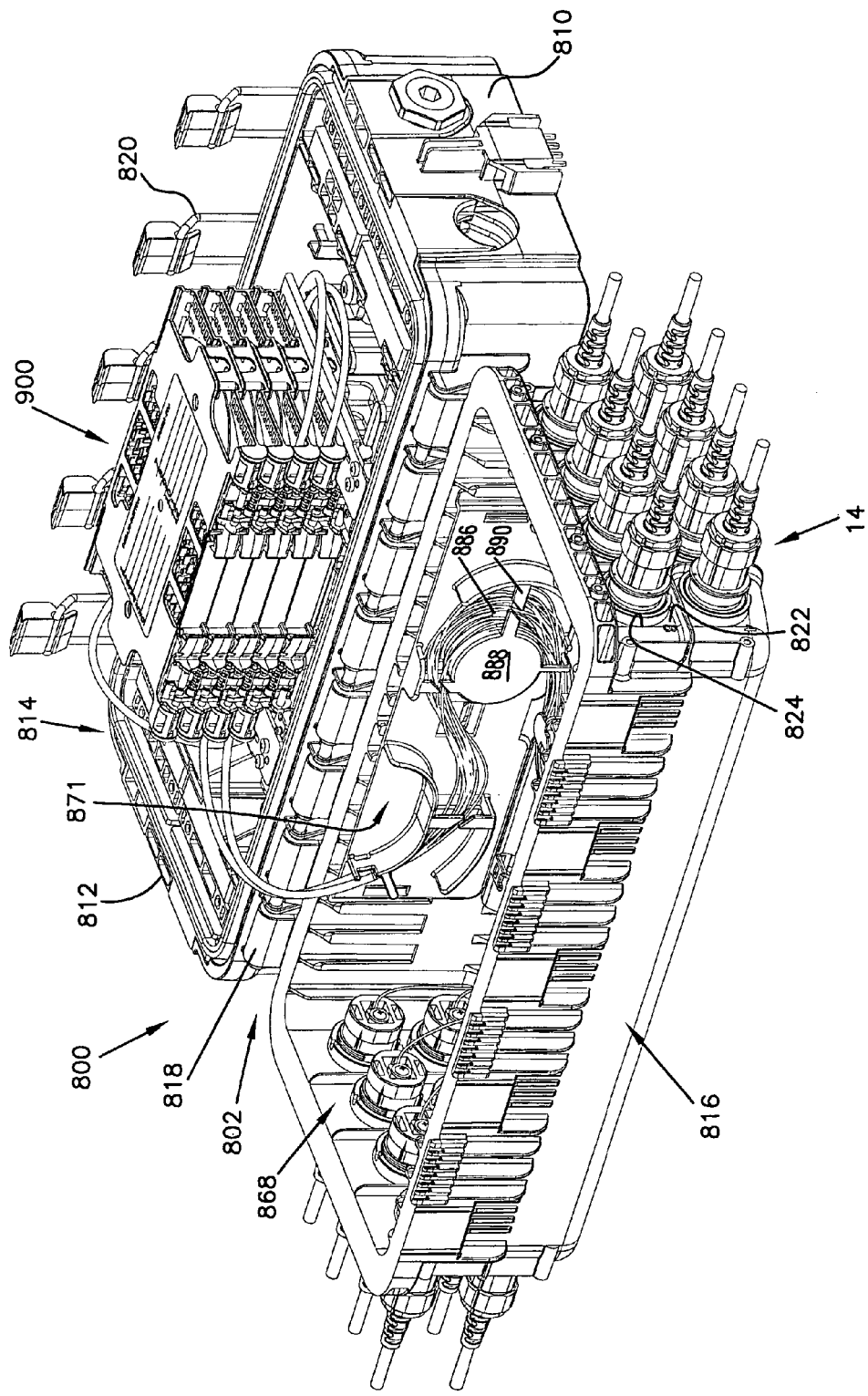

FIG. 30 is a perspective view of a fiber optic access terminal in an open position having exemplary features of aspects in accordance with the principles of the present disclosure.

Figure 31:
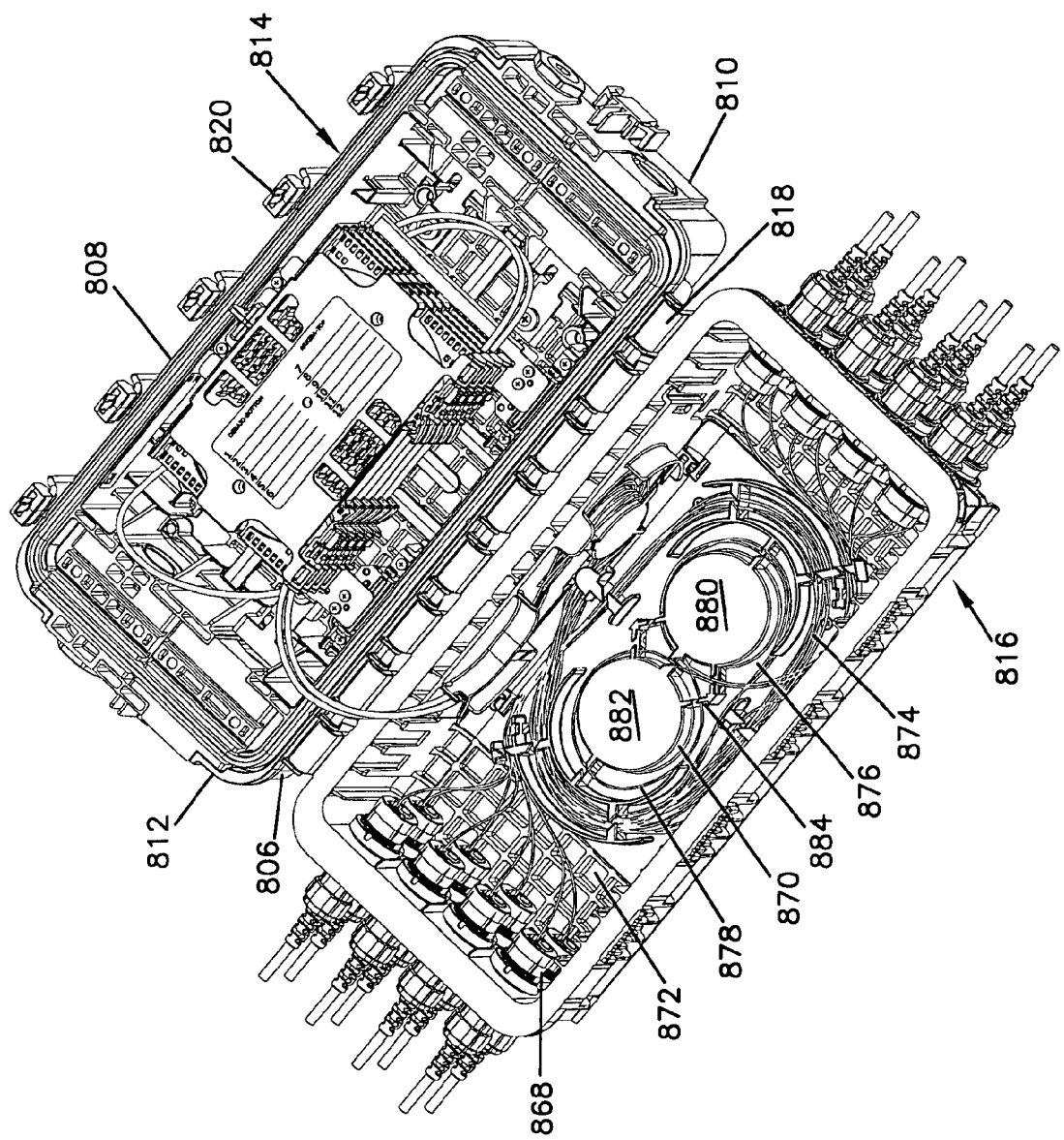

FIG. 31 is a perspective view of the fiber optic access terminal of FIG. 30 in the open position.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1 and 2, a cable pass-thru assembly, generally designated 10, is shown. The cable pass-thru assembly 10 includes a fiber optic cable, generally designated 12, and a cable pass-thru fitting, generally designated 14.

Figure 3:
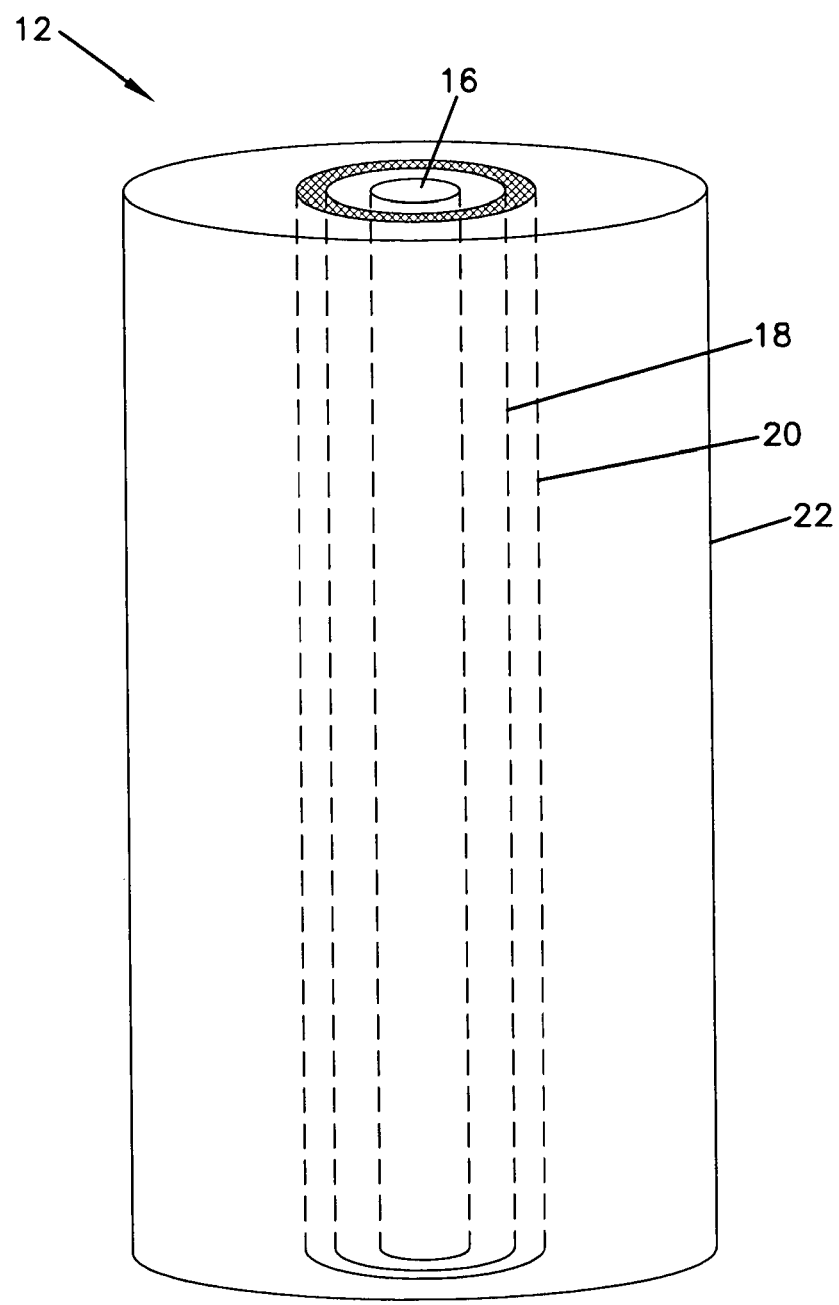
FIG. 3 is cross-sectional view of an exemplary fiber optic cable suitable for use with the cable pass-thru assembly of FIG. 1.

Referring now to FIG. 3, an exemplary fiber optic cable 12 that is suitable for use with the cable pass-thru fitting 14 is shown. The fiber optic cable 12 includes at least one optical fiber 16, a buffer layer 18 surrounding the optical fiber 16, a strength member 20, and an outer jacket 22.

The strength member 20 is adapted to inhibit axial tensile loading from being applied to the optical fiber 16. In one aspect of the present disclosure, the strength member 20 extends the length of the fiber optic cable 12 and is disposed in a generally longitudinal direction along the fiber optic cable 12 between the buffer layer 18 and the outer jacket 22. The strength member 20 can include yarns, fibers, threads, tapes, films, epoxies, filaments or other structures. In one aspect of the present disclosure, the strength layer 20 includes a plurality of aramid yarns.

Referring now to FIGS. 4-9, the cable pass-thru fitting 14 is shown. The cable pass-thru fitting 14 is adapted for receipt in a wall of a fiber optic access terminal. The cable pass-thru fitting 14 defines a path through with the fiber optic cable 12 can enter an interior region of the fiber optic access terminal. The cable pass-thru fitting 14 includes a housing assembly 24, an insert assembly, generally designated 26, and a sealing assembly, generally designated 28.

Figure 5:
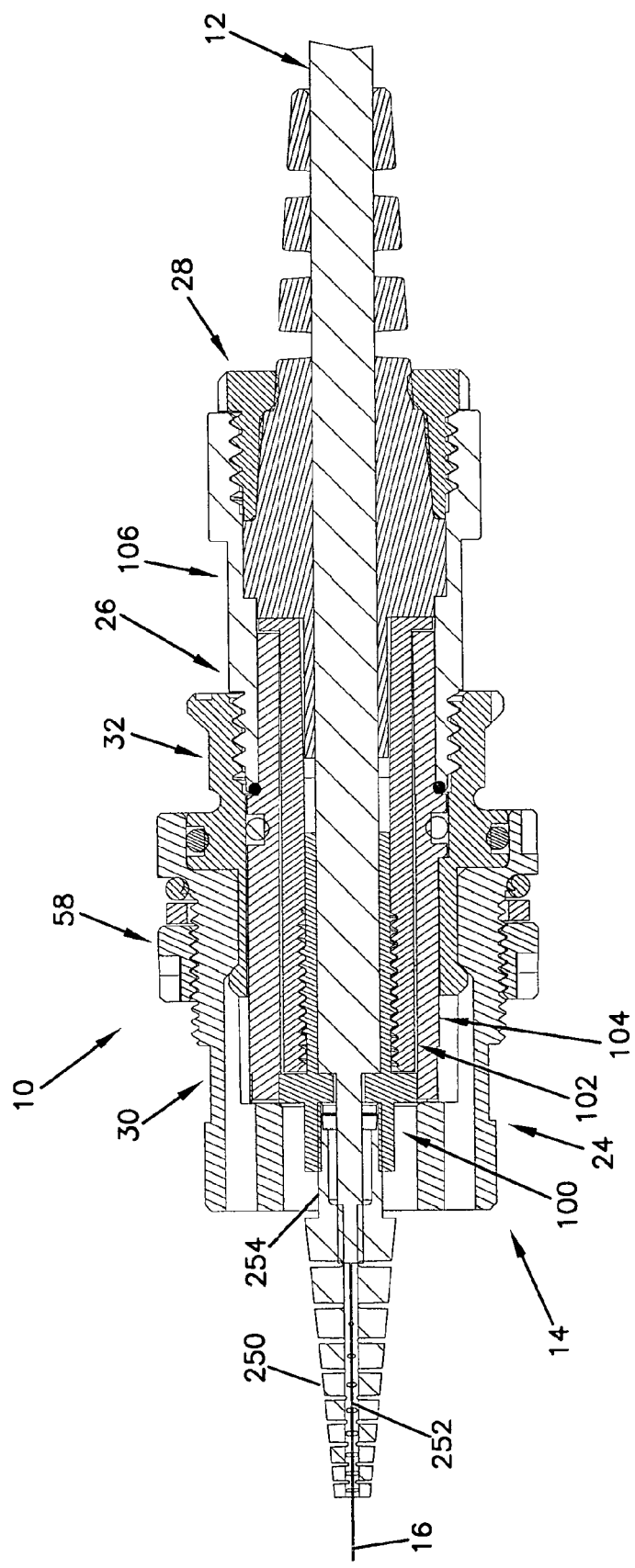
FIG. 5 is a cross-sectional view of the cable pass-thru assembly of FIG. 1.
Figure 7:
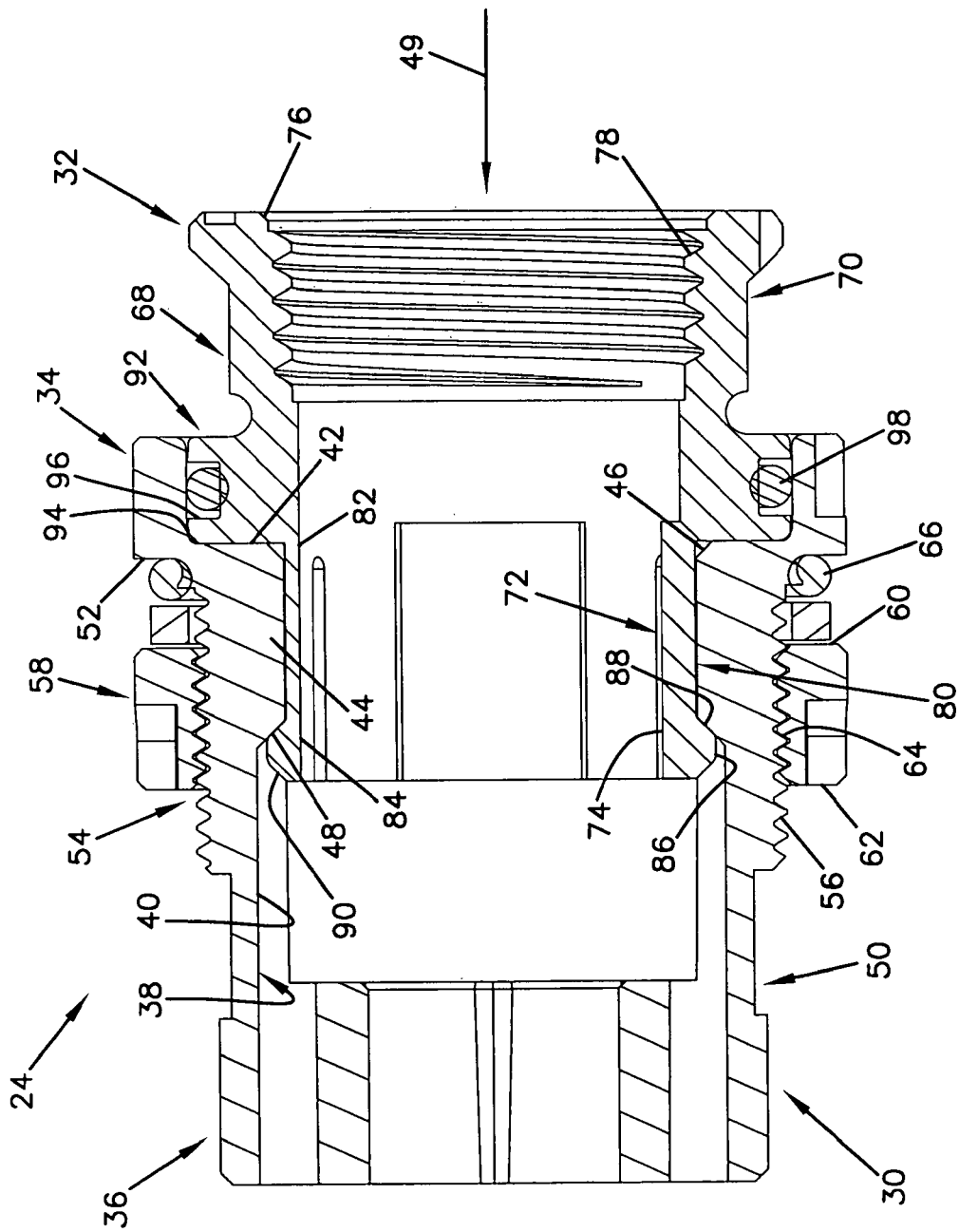
FIG. 7 is a cross-sectional view of a housing assembly suitable for use with the cable pass-thru assembly of FIG. 1.

Referring now to FIGS. 5 and 7, the housing assembly 24 is shown. The housing assembly 24 includes a body, generally designated 30, and a port member, generally designated 32.

The body 30 is generally cylindrical in shape and includes a first axial end portion 34 and an oppositely disposed second axial end portion 36. The body 30 defines a bore 38 that extends through the first and second axial end portions 34, 36. The bore 38 includes an interior surface 40 having an inner shoulder portion 42. The inner shoulder portion 42 is disposed in the first axial end portion 34 of the body 30.

The bore 38 further includes a protrusion 44. The protrusion 44 includes a first tapered surface 46 and an oppositely disposed second tapered surface 48. The first tapered surface 46 tapers inwardly with respect to a cable insertion direction 49 (shown as an arrow in FIG. 5) that extends from the first axial end portion 34 to the second axial end portion 36. The second tapered surface 48 tapers outwardly with respect to the cable insertion direction 49.

The body 30 further includes an exterior surface 50. The exterior surface 50 includes an external shoulder portion 52 at the first axial end portion 34 and a threaded portion 54 disposed between the external shoulder portion 52 and the second axial end portions 36. The threaded portion 54 includes a plurality of external threads 56.

The housing assembly 24 further includes a retention member 58. The retention member 58 is adapted for engagement with the exterior surface 50 of the body 30. In one aspect of the present disclosure, the retention member 58 is adapted for threaded engagement with the body 30.

The retention member 58 includes a first end 60, an oppositely disposed second end 62 and a plurality of internal threads 64. The plurality of internal threads 64 extends between the first and second ends 60, 62 and is adapted for engagement with the plurality of external threads 56 of the threaded portion 54 of the body 30. The retention member 58 and the body 30 are adapted to axially capture a wall of an enclosure between the first end 60 of the retention member 58 and the external shoulder portion 52 of the body 30 when the plurality of internal threads 64 is in engagement with the threaded portion 54. A sealing member 66 (e.g., gasket, o-ring, etc.) is disposed adjacent the external shoulder portion 52 and is adapted to provide an environmental seal between the body 30 and the wall of the enclosure.

The port member 32 of the housing assembly 24 is adapted for selective engagement with the bore 38 of the body 30. In one aspect of the present disclosure, the port member 32 is adapted for snap-fit engagement with the bore 38 of the body 30.

The port member 32 includes a body portion 68 having a first end portion 70 and an oppositely disposed second end portion 72. The port member 32 defines a passageway 74 that extends between the first and second end portions 70, 72.

The first end portion 70 defines an opening 76 to the passageway 74. In one aspect of the present disclosure, the opening 76 defines a plurality of threads 78.

The second end portion 72 includes a plurality of resilient tabs 80. Each of the resilient tabs 80 includes a base end 82 and an oppositely disposed free end 84. The base end 82 is engaged with the body portion 68 of the port member 32. In one aspect of the present disclosure, the base end 82 is integral with the body portion 68.

Each of the free ends 84 of the resilient tabs 80 includes a radial protrusion 86. The radial protrusion 86 extends radially outwardly from the port member 32. The radial protrusion 86 includes a first surface 88 and an oppositely disposed second surface 90. The first surface 88 tapers outwardly with respect to the cable insertion direction 49 while the second surface 90 tapers inwardly with respect to the cable insertion direction 49.

The port member 32 further includes an annular rim portion 92 disposed between the first end portion 70 and the second end portion 72. The annular rim portion 92 has an outer diameter that is greater than an outer diameter of the first end portion 70. The annular rim portion 92 includes a circumferential surface 94. The circumferential surface 94 defines a groove 96 that is adapted to receive a seal 98 (e.g., gasket, o-ring, etc.).

To engage the port member 32 to the body 30, the second end portion 72 of the port member 32 is inserted into the first axial end portion 34 of the bore 38 of the body 30. The port member 32 is advanced in the bore 38 of the body 30 in the cable insertion direction 49. As the port member 32 is advanced, the second surface 90 engages the first tapered surface 46 of the protrusion 44 of the body 30. The advancement of the port member 32 in the bore 38 of the body 30 and the engagement of the second surface 90 and the first tapered surface 46 causes the free ends 84 of the resilient tabs 80 to flex inwardly. The port member 32 is advanced in the bore 38 of the body 30 until the annular rim portion 92 abuts the internal shoulder 42 of the bore 38 of the body 30. With the annular rim portion 92 abutting the internal shoulder 42 of the body 30, the free ends 84 of the resilient tabs 80 snap back or flex outwardly such that the first surfaces 88 of the resilient tabs 80 engage the second tapered surface 48 of the protrusion 44 of the body 30. The engagement of the first surfaces 88 of the resilient tabs 80 and the second tapered surface 48 of the body 30 reduces the risk of the port member 32 becoming dislodged from the body 30.

With the port member 32 disposed in the bore 38 of the body 30, the seal 98 abuts the interior surface 40 of the bore 38 at the first axial end portion 34. The seal 98 provides an environmental seal between an exterior surface of the port member 32 and the interior surface 40 of the bore 38 of the body 30.

Figure 8:
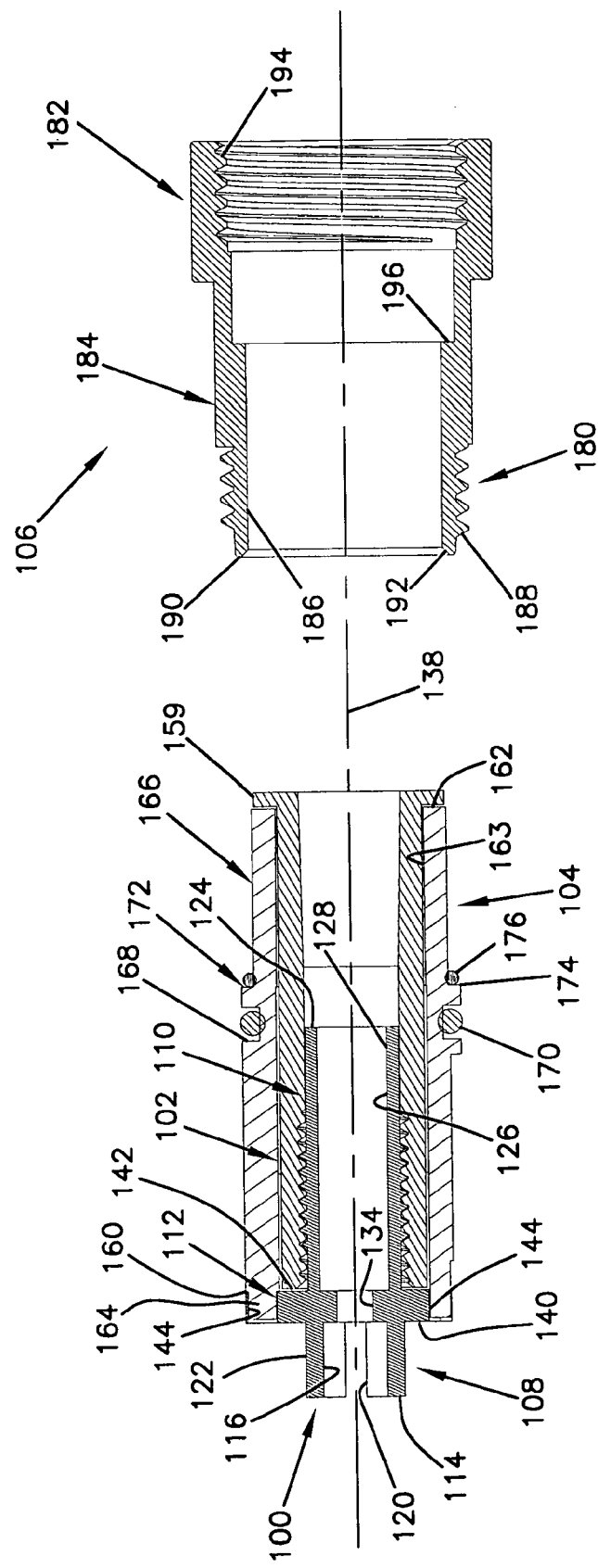
FIG. 8 is a cross-sectional exploded view of an insert assembly suitable for use with the cable pass-thru assembly of FIG. 1.
Figure 9:
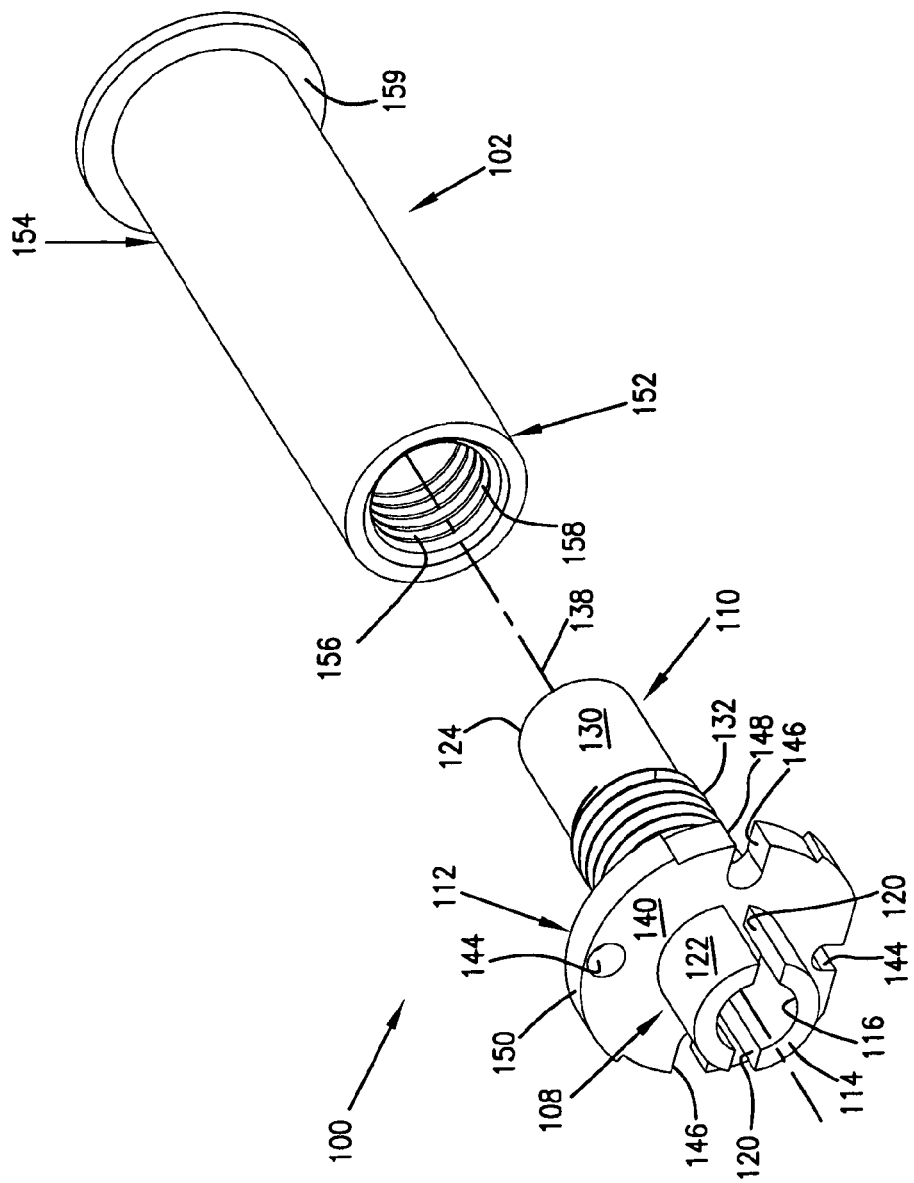
FIG. 9 is an exploded perspective view of a nozzle and an inner sleeve of the insert assembly of FIG. 8.

Referring now to FIGS. 5, 8 and 9, the insert assembly 26 is shown. The insert assembly 26 is adapted to retain the fiber optic cable 12 in the cable thru-pass fitting 14. The insert assembly 26 includes a nozzle, generally designated 100, an inner sleeve, generally designated 102, an outer sleeve, generally designated 104, and a retainer, generally designated 106.

The nozzle 100 includes a first axial end 108, an opposite second axial end 110 and a collar 112 disposed between the first and second axial ends 108, 110. In one aspect of the present disclosure, an outer diameter of the collar 112 is greater than an outer diameter of the first and second axial ends 108, 110.

In one aspect of the present disclosure, the first axial end 108 of the nozzle 100 is generally cylindrical in shape and includes a first axial end surface 114. The first axial end 108 defines a first bore 116 having a first opening 118 at the first axial end surface 114. The first axial end 108 further defines a slot 120. In one aspect of the present disclosure, the first axial end 108 defines two slots 120. The slots 120 radially extend through an outer surface 122 of the first axial end 108 into the first bore 116. In one aspect of the present disclosure, the slots 120 axially extend from the first axial end surface 114 to the collar 112.

In one aspect of the present disclosure, the second axial end 110 of the nozzle 100 is generally cylindrical in shape and includes a second axial end surface 124. The second axial end 110 defines a second bore 126 having a second opening 128 at the second axial end surface 124. The second bore 126 is adapted to receive the fiber optic cable 12. In one aspect of the present disclosure, the second bore 126 is sized to be slightly larger than an outer diameter of the outer jacket 22 of the fiber optic cable. In one aspect of the present disclosure, the second bore 126 is axially aligned with the first bore 116.

An exterior surface 130 of the second axial end 110 includes a plurality of threads 132. In one aspect of the present disclosure, the plurality of threads 132 is disposed adjacent to the collar 112. In another aspect of the present disclosure, the plurality of threads 132 extends at least partially along the exterior surface 130 of the second axial end 110. The purpose of the plurality of threads 132 will be described in greater detail subsequently.

The collar 112 of the nozzle 100 defines a cable passage 134. In one aspect of the present disclosure, the cable passage 134 is sized to receive the optical fiber 16 and the strength member 20 of the fiber optic cable 12. In another aspect of the present disclosure, the cable passage 134 is sized to receive the optical fiber 16, the buffer layer 18 and the strength member 20 of the fiber optic cable 12. The cable passage 134 is axially aligned with the first bore 116 and the second bore 126. The cable passage 134 is adapted to provide a path between the first bore 116 and the second bore 126 through which at least portions of the fiber optic cable 12 can pass.

In one aspect of the present disclosure, the collar 112 extends radially outward from the first axial end 108. The collar 112 includes a first end surface 140 that faces toward the first axial end 108 of the nozzle 100 and an oppositely disposed second end surface 142 that faces toward the second axial end 110. In one aspect of the present disclosure, the first and second end surfaces 140, 142 are generally perpendicular to a central longitudinal axis 143 (shown as a dashed line in FIG. 6) that extends through the first and second axial ends 108, 110.

The collar 112 defines at least one alignment opening 144 that extends through the first and second end surfaces 140, 142. In one aspect of the present disclosure, the collar 112 includes two alignment openings 144 that are oppositely disposed. The alignment openings 144 are adapted to prevent the nozzle 100 and the inner sleeve 102 from rotating about the central longitudinal axis 138 in the outer sleeve 104.

The collar 112 further defines a notch 146. In one aspect of the present disclosure, the collar 112 defines two notches 146 that are oppositely disposed. Each of the notches 146 defines a notch opening 148 at an outer circumferential surface 150 of the collar 112. Each of the notches 146 extends radially inward toward the cable passage 134. In one aspect of the present disclosure, the notches 146 do not intersect the cable passage 134. Each of the notches 146 extend axially through the collar 112 from the first end surface 140 to the second end surface 142. In one aspect of the present disclosure, each of the notches 146 is aligned with one of the slots 120 of the first axial end 108.

Referring still to FIGS. 5 and 8-10, the inner sleeve 102 is adapted for engagement with the second axial end 110 of the nozzle 100. The inner sleeve 102 includes a first end portion 152 and an oppositely disposed second end portion 154. The inner sleeve 102 defines a bore 156 that extends axially from the first end portion 152 to the second end portion 154. In one aspect of the present disclosure, the bore 156 is sized to receive the second axial end 110 of the nozzle 100. In one aspect of the present disclosure, the bore 156 at the first end portion 152 of the inner sleeve 102 includes a plurality of inner threads 158 that is adapted for engagement with the plurality of threads 132 on the exterior surface 130 of the second axial end 110 of the nozzle 100.

The second end portion 154 of the inner sleeve 102 includes a flange 159 that extends radially outward from the second end portion 154. The collar 112 of the nozzle 100 and the flange 159 of the inner sleeve 102 are adapted to axially capture the outer sleeve 104.

Referring now to FIGS. 5 and 8, the outer sleeve 104 is generally cylindrical in shape. The outer sleeve 104 includes a first end face 160 and an oppositely disposed second end face 162. The outer sleeve 104 defines an inner passageway 163 that extends from the first end face 160 to the second end face 162. The inner passageway 163 is adapted to receive the second axial end 110 of the nozzle 100 and the first end portion 152 of the inner sleeve 102.

The first end face 160 includes an alignment pin 164 that extends outwardly from the first end face 160 in an axial direction. In one aspect of the present disclosure, the axial direction is generally perpendicular to the first end face 160. In one aspect of the present disclosure, the first end face 160 includes two alignment pins 164. The alignment pins 164 are adapted to be received in the alignment openings 144 of the collar 112 of the nozzle 100. As previously provided, the engagement of the alignment pins 164 and the alignment openings 144 prevent rotation of the nozzle 100 and the inner sleeve 102 relative to the outer sleeve 104 about the longitudinal axis 138.

The outer sleeve 104 includes an exterior surface, generally designated 166. The exterior surface 166 defines a groove 168 disposed between the first end face 160 and the second end face 162. The groove 168 is adapted to receive a seal 170 (e.g., gasket, o-ring, etc.). The seal 170 is adapted to provide an environmental seal between the outer sleeve 104 and the passageway 74 of the port member 32.

The exterior surface 166 includes a lip 172 disposed between the groove 168 and the second end face 162. The lip 172 extends radially outward from the exterior surface 166 and includes an end surface 174 that faces in the same direction as the second end face 162. In one aspect of the present disclosure, the exterior surface 166 further includes a seal 176 (e.g., gasket, o-ring, etc.) disposed adjacent to the end surface 174 of the lip 172 between the lip 172 and the second end face 162.

The retainer 106 includes a first end section 180, an oppositely disposed second end section 182 and an outer surface 184 that extends between the first and second end sections 180, 182. The retainer 106 defines an internal bore 186 that extends axially through the first and second end sections 180, 182.

The outer surface 184 of the first end section 180 includes a plurality of external threads 188. The plurality of external threads 188 is adapted for engagement with the plurality of threads 78 of the port member 32.

The first end section 180 of the retainer 106 further includes an axial end face 190. In one aspect of the present disclosure, the axial end face 190 includes a tapered portion 192. The tapered portion 192 is adapted to provide sealing engagement with the seal 176 disposed adjacent to the lip 172 of the outer sleeve 104.

The internal bore 186 includes a plurality of internal threads 194. In one aspect of the present disclosure, the plurality of internal threads 194 is disposed in the internal bore 186 at the second end section 182. The internal bore 186 further includes an annular rim 196. The annular rim 196 is disposed between the first and second end sections 180, 182 and is formed by an inner diameter of the internal bore 186 in the second end section 182 being larger than an inner diameter of the internal bore 186 in the first end section 180.

Figure 4:
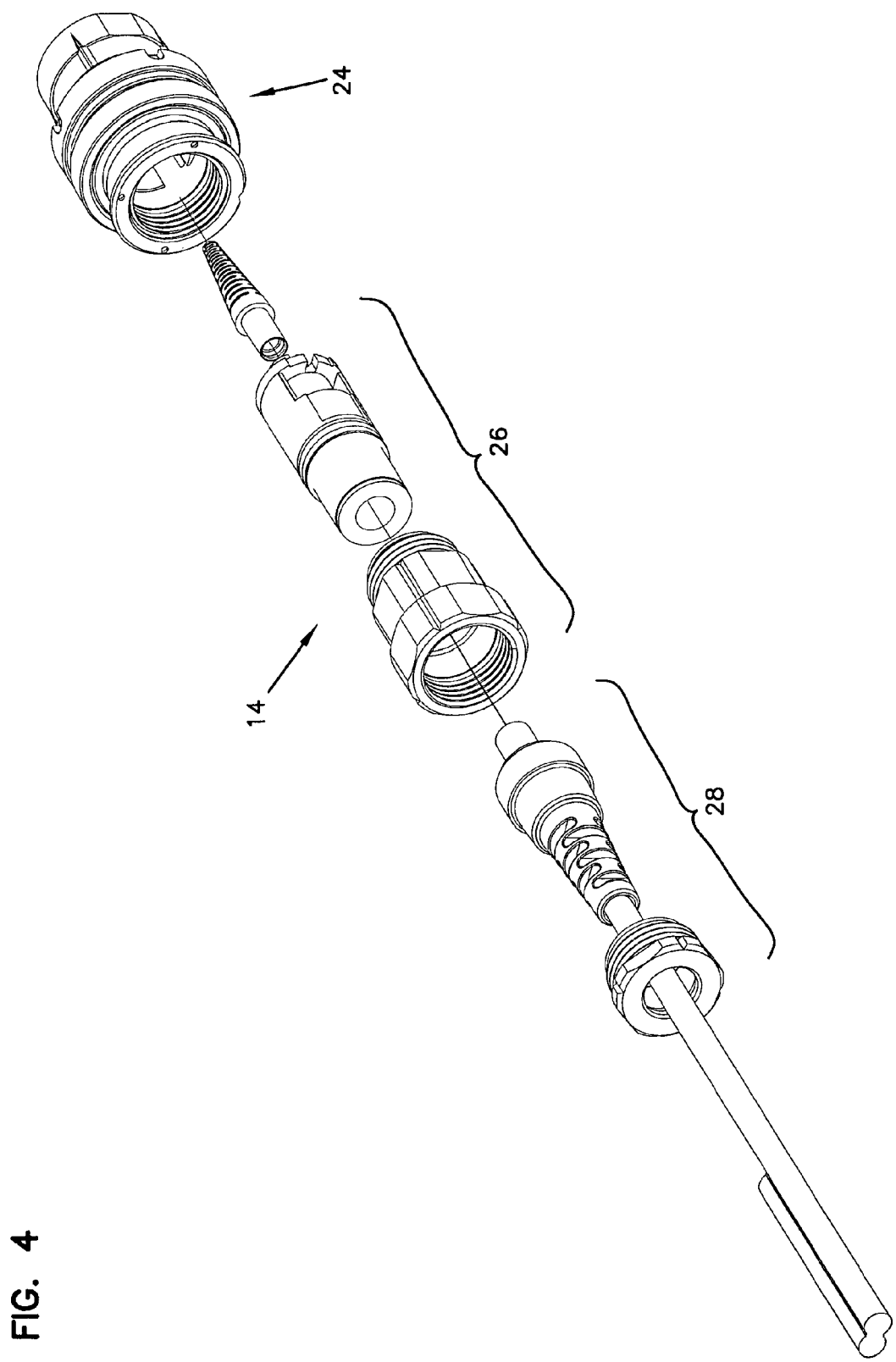
FIG. 4 is an exploded perspective view of the cable pass-thru assembly of FIG. 1.
Figure 11:
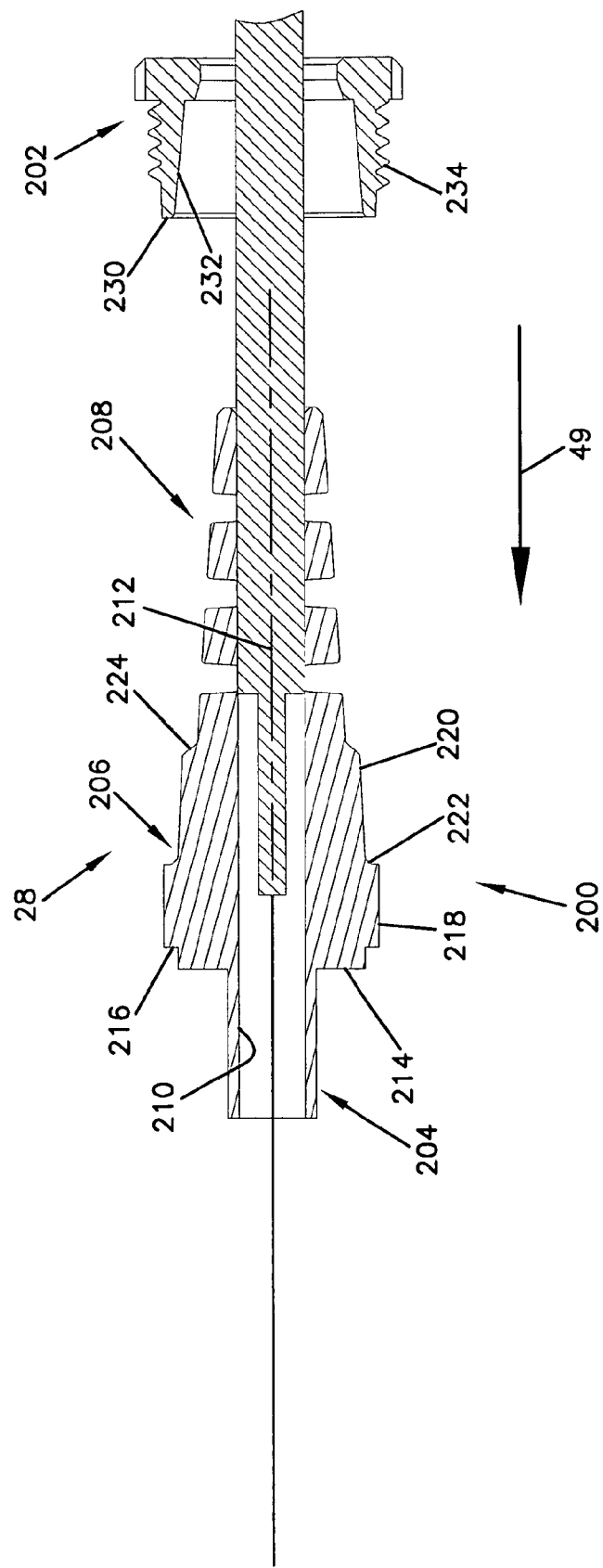
FIG. 11 is a cross-sectional view of a sealing assembly suitable for use with the cable pass-thru assembly of FIG. 1.

Referring now to FIGS. 4, 5 and 11, the sealing assembly 28 is shown. The sealing assembly 28 includes a sealing member, generally designated 200, and an end plug, generally designated 202.

The sealing member 200 is a flexible and resilient sealing member that can be manufactured from conventional sealing materials. The sealing member 200 includes a first region 204, a second region 206 that is adjacent to the first region 204, a strain relief region 208, and a cable passage 210 that extends through the first and second regions 204, 206 and the strain relief region 208 along a central longitudinal axis 212.

The first region 204 is general cylindrical in shape. In one aspect of the present disclosure, the first region 204 is sized for receipt in the bore 156 of the second end portion 154 of the inner sleeve 102 of the insert assembly 26.

The second region 206 of the sealing member 200 includes a first surface 214 that is generally perpendicular to the central longitudinal axis 212. The first surface 214 is adapted to abut the flange 159 of the inner sleeve 102 of the insert assembly 26 when the first region 204 is disposed in the bore 156 of the inner sleeve 102.

The second region 206 further includes a second surface 216 that is axially offset from the first surface 214. The second surface 216 is generally perpendicular to the central longitudinal axis 212 and includes an outer diameter that is greater than the outer diameter of the first surface 214. The second surface 216 is adapted to abut the annular rim 196 in the internal bore 186 of the retainer 106 when the first region 204 is disposed in the bore 156 of the inner sleeve 102.

The second region 206 further includes a circumferential surface 218 that extends about the central longitudinal axis 212 such that the circumferential surface 218 is parallel to the central longitudinal axis 212. The circumferential surface 218 is disposed adjacent to the second surface 216. The circumferential surface 218 is adapted for receipt in the internal bore 186 of the retainer 106.

The second region 206 further includes a tapered portion 220 of the sealing member 200. The tapered portion 220 is disposed between the circumferential surface 218 and the strain relief region 208. The tapered portion 220 tapers outwardly with respect to the cable insertion direction 49. The tapered portion 220 includes a first end surface 222 and a second end surface 224. The first and second end surfaces 222, 224 are generally perpendicular to the central longitudinal axis 212 and face in a direction that is opposite the cable insertion direction 49. The first end surface 222 is disposed immediately adjacent to the circumferential surface 218 while the second end surface 224 is disposed immediately adjacent to the strain relief region 208.

The end plug 202 includes an axial end 230 and defines a thru-bore 232. The axial end 230 is adapted to engage the first end surface 222 of the tapered portion 220 of the sealing member 200 when the end plug 202 is fully engaged with the second end section 182 of the retainer 106.

The thru-bore 232 is adapted to abut the tapered portion 220 of the sealing member 200 when the end plug 202 is engaged with the second end section 182 of the retainer 106. The end plug 202 includes a plurality of external threads 234 disposed on an external surface 236 of the end plug 202. As the plurality of external threads 234 are engaged with the plurality of internal threads 194 of the retainer 106, the thru-bore 232 engages the tapered portion 220 of the sealing member 200 and causes the cable passage 210 to constrict. As the cable passage 210 constricts, the sealing member 200 seals around the fiber optic cable 12 in the cable passage 210. As the plurality of external threads 234 are engaged with the retainer 106, the axial end 230 engages the first end surface 222 and compresses the circumferential surface 218 between the annular rim 196 of the retainer 106 and the axial end 230 of the end plug 202. As the circumferential surface 218 is compressed, the outer diameter of the circumferential surface 218 increases such that the sealing member 200 seals against the internal bore 186 of the retainer 106.

Referring now to FIGS. 5-11, the assembly of the cable pass-thru fitting 14 and the insertion of the fiber optic cable 12 through the cable pass-thru fitting 14 will be described. An end 240 of the fiber optic cable 12 is passed through the thru-bore 232 of the end plug 202 and the cable passage 210 of the sealing member 200. The end 240 of the fiber optic cable 12 is then passed through the internal bore 186 of the retainer 106, the bore 156 of the inner sleeve 102, the inner passageway 163 of the outer sleeve 104 and the second bore 126 of the nozzle 100. At least the optical fiber 16 and the strength member 20 pass through the cable passageway 134 of the nozzle 100. The optical fiber 16 passes through the first bore 116 of the nozzle 100 and through the passageway 74 of the port member 32 and the bore 38 of the body 30 of the housing assembly 24.

The strength member 20 passes through the slot 120 of the nozzle 100 and through the notch opening 148 of the collar 112 and into the notch 146 in the collar 112. With the strength member 20 disposed through the slot 120 and the notch 146, an end of the strength member 20 faces in a direction that is opposite the cable insertion direction 49. An end portion of the strength member 20 is then wrapped around the exterior surface 130 of the second axial end 110. The strength member 20 is wrapped around the exterior surface 130 such that at least a portion of the end of the strength member 20 wraps around at least a portion of the plurality of external threads 132.

With the strength member 20 wrapped around at least a portion of the plurality of external threads 132, the inner threads 158 of the first end portion 152 of the inner sleeve 102 are engaged with the external threads 132 of the nozzle 100 so that at least a portion of the strength member 20 is disposed between the external threads 132 of the nozzle 100 and the inner threads 158 of the inner sleeve 102. With the inner sleeve 102 engaged with the nozzle 100, the outer sleeve 104 is axially retained between the collar 112 of the nozzle 100 and the flange 159 of the inner sleeve 102.

The second end portion 72 of the port member 32 is engaged with the first axial end portion 34 of the body 30. With the port member 32 engaged with the body 30 and the inner sleeve 102 and the nozzle 100 disposed in the inner passage 163 of the outer sleeve 104, the insert assembly 26 is advanced into the passageway 74 and the bore 38 of the port member 32 and the body 30 of the housing assembly 24, respectively.

The retainer 106 is advanced into the passageway 74 of the port member 32 such that the nozzle 100, inner sleeve 102 and outer sleeve 104 are retained in the housing assembly 24. In one aspect of the present disclosure, the retainer 106 is threaded into the passageway 74 of the port member 32.

The sealing member 200 is advanced into the internal bore 186 of the retainer 106. The end plug 202 engages the retainer 106 and advances the sealing member 200 into the internal bore 186 until the first surface 214 of the sealing member 200 sealingly abuts the annular rim 196 in the internal bore 186 of the retainer 106 and the cable passage 210 sealing constricts around the fiber optic cable 12.

The fiber optic cable 12 is axially retained in the cable pass-thru fitting 14 by the engagement of the strength member 20 with the insert assembly 26. With the strength member 20 captured between threads of the insert assembly 26, a pull-out force applied to the fiber optic cable 12 in a direction opposite the cable insertion direction 49 is transferred to the cable pass-thru fitting 14 through the engagement between the strength member 20 and the insert assembly 26. This force transfer prevents the pull-out force from acting directly on the optical fiber 16 of the fiber optic cable and potentially damaging the optical fiber 16.

Referring now to FIG. 5, the cable pass-thru fitting 14 can include a strain relief boot 250. The cable strain relief boot 250 is adapted to engage the first axial end 108 of the nozzle 100. In one aspect of the present disclosure, the strain relief boot 250 defines an optical fiber passage 252 and includes an end portion 254 that is generally cylindrical in shape. The optical fiber passage 252 is adapted to receive the optical fiber 16.

The end portion 254 is adapted to be received in the first bore 116 of the first axial end 108 of the nozzle 100. In another embodiment, the end portion 254 of the strain relief boot 250 is adapted to receive the first axial end 108 such that the strain relief boot 250 is disposed about the outer surface 122 of the first axial end 108. The strain relief boot 250 is adapted to reduce the risk of the optical fiber 16, which passes through the cable pass-thru fitting 14, from being bent beyond the minimum bend radius of the optical fiber.

Figure 13:
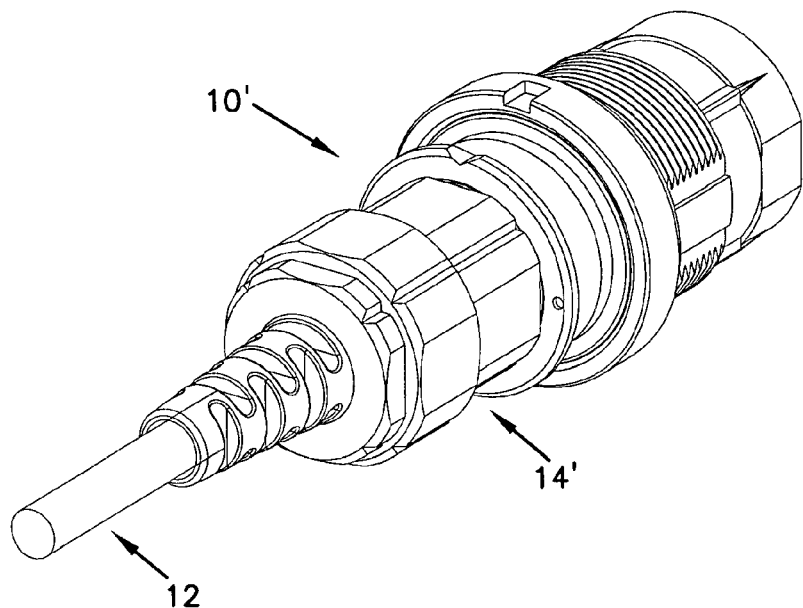
FIG. 13 is a rear perspective view of the cable pass-thru assembly of FIG. 12.

Referring now to FIGS. 12 and 13, an alternate embodiment of a cable pass-thru assembly 10' is shown. The cable pass-thru assembly 10' includes the fiber optic cable 12 and a cable pass-thru fitting 14'.

Referring now to FIGS. 14-17, the cable pass-thru fitting 14' includes the housing assembly 24, an alternate embodiment of an insert assembly 26', and the sealing assembly 28. The housing assembly 24 includes the body 30 and the port member 32. The sealing assembly 28 includes the sealing member 200 and the end plug 202. Descriptions of the components of the housing assembly 24 and the sealing assembly 28 have been described above.

The insert assembly 26' is adapted to receive and retain the fiber optic cable 12. The insert assembly 26' includes a nozzle 300, a retention member 302 that is adapted for threaded engagement with the nozzle 300, a sleeve 304 and the retainer 106 that is adapted for engagement with the port member 32 of the housing assembly 24.

The nozzle 300 includes a first axial end 308, an opposite second axial end 310 and a collar 312 disposed between the first and second axial ends 308, 310. In one aspect of the present disclosure, the first axial end 308 of the nozzle 300 is offset from a central longitudinal axis 313 that axially extends through the nozzle 300.

The nozzle 300 includes a first axial end surface 314. The first axial end 308 defines a cavity 316 having an opening 318 at the first axial end surface 314. In one aspect of the present disclosure, the cavity 316 of the first axial end 308 includes a plurality of internal threads 319. The cavity 316 is adapted to receive the retention member 302.

In one aspect of the present disclosure, the second axial end 310 is generally semi-cylindrical in shape and defines a cable path 326. The cable path 326 is adapted to receive the fiber optic cable 12. The cable path 326 is generally aligned with the central longitudinal axis 313 of the nozzle 300.

The second axial end 310 includes a plurality of tabs 328. The tabs 328 are adapted to engage the sleeve 304. The tabs 328 include a flange portion 329 that extends radially outwardly from an exterior surface 330 of the second axial end 310.

The collar 312 of the nozzle 300 defines a cable passage 334. In one aspect of the present disclosure, the cable passage 334 is sized to receive the optical fiber 16 and the strength member 20 of the fiber optic cable 12. In another aspect of the present disclosure, the cable passage 334 is sized to receive the optical fiber 16, the buffer layer 18 and the strength member 20 of the fiber optic cable 12.

The cable passage 334 defines a longitudinal axis 335 that extends through the collar 312. The longitudinal axis 335 is parallel to the central longitudinal axis 313 of the nozzle 300. In one aspect of the present disclosure, the longitudinal axis 335 is offset from the central longitudinal axis 313.

In one aspect of the present disclosure, the collar 312 includes a first end surface 340 that faces toward the first axial end 308 of the nozzle 300 and an oppositely disposed second end surface 342 that faces toward the second axial end 310. In one aspect of the present disclosure, the first and second end surfaces 340, 342 are generally perpendicular to a central longitudinal axis 313 that extends through the first and second axial ends 308, 310.

The collar 312 defines at least one alignment opening 344 that extends through the first and second end surfaces 340, 342. In one aspect of the present disclosure, the collar 312 includes two alignment openings 344 that are oppositely disposed. The alignment openings 344 are adapted to prevent the nozzle 100 from rotating about the central longitudinal axis 313 in the sleeve 304.

The nozzle 300 includes an axial slot 345 that extends between the collar 312 and the second axial end 310. The axial slot 345 provides an opening through which fiber optic cable can be placed into the cable passage 334 of the collar 312 and the cable path 326 of the second axial end 310. The axial slot 345 is potentially advantageous as the fiber optic cable 12 can be laid into the cable passage 334 and the cable path 326 rather than being threaded through the cable passage 334 and the cable path 326.

The sleeve 304 includes a first end face 360 and an oppositely disposed second end face 362. The outer sleeve 304 defines an inner passageway 363 that extends from the first end face 360 to the second end face 362. The inner passageway 363 is adapted to receive the second axial end 310 of the nozzle 300.

The first end face 360 includes an alignment pin 364 that extends outwardly from the first end face 360 in an axial direction. In one aspect of the present disclosure, the axial direction is generally perpendicular to the first end face 360. In one aspect of the present disclosure, the first end face 360 includes two alignment pins 364. The alignment pins 364 are adapted to be received in the alignment openings 344 of the collar 312 of the nozzle 300. As previously provided, the engagement of the alignment pins 364 and the alignment openings 344 prevent rotation of the nozzle 300 relative to the sleeve 304 about the longitudinal axis 313.

The sleeve 304 includes an exterior surface, generally designated 366. The exterior surface 366 defines a groove 368 disposed between the first end face 360 and the second end face 362. The groove 368 is adapted to receive a seal 370 (e.g., gasket, o-ring, etc.). The seal 370 is adapted to provide an environmental seal between the sleeve 304 and the passageway 74 of the port member 32.

The exterior surface 366 includes a lip 372 disposed between the groove 368 and the second end face 362. The lip 372 extends radially outward from the exterior surface 366. In one aspect of the present disclosure, the exterior surface 366 further includes a seal 376 (e.g., gasket, o-ring, etc.) disposed adjacent to the lip 372 between the lip 372 and the second end face 362. The seal 376 is adapted to provide sealing engagement between the lip 372 and the tapered portion 192 of the axial end face 190 of the retainer 106.

Referring now to FIGS. 12-17, the assembly of the cable pass-thru fitting 14' and the insertion of the fiber optic cable 12 through the cable pass-thru fitting 14' will be described. The fiber optic cable 12 is passed through the end plug 202 and the sealing member 200. The fiber optic cable 12 is then passed through the retainer 106 and the inner passageway 363 of the outer sleeve 304.

The fiber optic cable 12 is then inserted through the axial slot 345 of the nozzle 300 such that the fiber optic cable 12 enters the cable path 326 of the second axial end 310 and at least the optical fiber 16 and the strength member 20 enter the cable passage 334 of the collar 312. With the fiber optic cable 12 disposed in the cable path 326 of the second axial end 310 and at least the optical fiber 16 and the strength member 20 disposed in the cable passage 334 of the collar 312, the insert assembly 26' is advanced through the housing assembly 24. The retainer 106 is then engaged with the port member 32 of the housing assembly 24 to retain the insert assembly 26' in the housing assembly 24. The sealing member 200 is then inserted into the internal bore 186 of the retainer 106 and compressed about the fiber optic cable 12 by the end plug 202.

With the insert assembly 26' disposed in the housing assembly 24, at least a portion of the strength member 20 is wrapped around a plurality of threads 379 of the retention member 302. With the strength member 20 wrapped around at least a portion of the plurality of threads 379, the retention member 302 is engaged with the cavity 316 of the first axial end 308 of the nozzle so that at least a portion of the strength member 20 is disposed between the plurality of threads 379 of the retention member 302 and the plurality of internal threads 319 of the cavity 316 of the first axial end 308 of the nozzle 300.

Referring now to FIGS. 18-21, an alternate embodiment of a nozzle 400 suitable for use with the cable pass-thru fitting 14 is shown. The nozzle 400 includes a first axial end 408, an opposite second axial end 410 and a collar 412 disposed between the first and second axial ends 408, 410.

The first axial end 408 includes a first axial end surface 414 and defines a first bore 416 and a first slot 420a. The first slot 420a radially extends through an outer surface 422 of the first axial end 408 into the first bore 416. In one aspect of the present disclosure, the first slot 420a extends axially from the first axial end surface 414 to the collar 412.

The second axial end 410 includes a second axial end surface 424 and defines a second bore 426. The second bore 426 is adapted to receive the fiber optic cable 12. A cable slot 430 extends axially through the nozzle 400 from the first axial end surface 414 to the second axial end surface 424. The cable slot 430 is adapted to allow the fiber optic cable 12 to pass through the cable slot 430 and into the first and second bores 416, 426.

The collar 412 of the nozzle 400 defines a cable passage 434. In one aspect of the present disclosure, the cable passage 434 is sized to receive the optical fiber 16 and the strength member 20 of the fiber optic cable 12. In another aspect of the present disclosure, the cable passage 434 is sized to receive the optical fiber 16, the buffer layer 18 and the strength member 20 of the fiber optic cable 12. The cable passage 434 is axially aligned with the first bore 416 and the second bore 426.

The collar 412 includes a first end surface 440 that faces toward the first axial end 408 of the nozzle 400 and an oppositely disposed second end surface 442 that faces toward the second axial end 410.

The collar 412 defines at least one alignment opening 444 that extends through the first and second end surfaces 440, 442. In one aspect of the present disclosure, the collar 412 includes two alignment openings 444 that are oppositely disposed.

The collar 412 further defines a retention opening 446. The retention opening 446 extends axially through the collar 412 from the first end surface 440 to the second end surface 442. In one aspect of the present disclosure, the retention opening 446 is aligned with the first slot 420a of the first axial end 408.

The retention opening 446 is adapted to receive a retention member 448. The retention member 448 includes a first end portion 450 and a second end portion 452. The retention member 448 defines a thru-bore 454 that extends axially through the first and second end portions 450, 452 of the retention member 448. In one aspect of the present disclosure, the retention member 448 includes a counter bore 456 at the second end portion 452 that is axially aligned with the thru-bore 454. An inner diameter of the counter bore 456 is sized to be larger than an inner diameter of the thru-bore 454.

The retention member 448 is disposed in the collar 412 such that the counter bore 456 opens toward the second end surface 442 of the collar 412. The first end portion 450 of the retention member 448 includes a plurality of radial protrusions 458 that are adapted to engage the first end surface 440 of the collar 412. The engagement of the radial protrusions 458 and the first end surface 440 of the collar 412 prevents the retention member 448 from being inadvertently displaced from the collar 412.

The retention member 448 defines an axial slot 460 that extends axially from the first end portion to the second end portion 450, 452. The slot 460 extends radially through the outer surface of the retention member 448 to the thru-bore 454 and the counter bore 456. The slot 460 is adapted to allow the strength member 20 of the fiber optic cable 12 to pass through the slot 460 and into the thru-bore 454 and counter bore 456.

Referring now to FIG. 21, the insertion of the fiber optic cable 12 into the nozzle 400 will be described. The fiber optic cable 12 is inserted radially through the cable slot 430 of the nozzle 400. While the fiber optic cable 12 is disposed in the second bore 426, at least the optical fiber 16 and the strength member 20 of the fiber optic cable 12 are disposed in the first bore 416 and the cable passage 434.

The strength member 20 is inserted through the retention opening 446 of the collar 412 and through the slot 460 of the retention member 448 so that the strength member 20 is disposed in the thru-bore 454 of the retention member 448. With the strength member 20 disposed in the thru-bore 454, the strength member 20 is tied to form a knot 462. The knot 462 is disposed in the counter bore 456 of the retention member 448. The knot 462 is tied such that an outer diameter of the knot 462 is greater than an inner diameter of the thru-bore 454.

The retention member 448 is inserted into the retention opening 446 such that the radial protrusions 458 of the first end portion 450 engage the first end surface 440 of the collar 412. When the retention member 448 is inserted into the retention opening 446 of the collar 412, the outer diameter of the retention member 448 decreases. This decrease in diameter is caused by inner diameter of the retention opening 446 being smaller than the outer diameter of the retention member 448. The outer diameter of the retention member 448 is able to decrease by decreasing the width of the slot 460. As the width of the slot 460 decreases, the inner diameter of the counter bore 456 decreases. This decrease in the inner diameter of the counter bore 456 slightly compresses the knot 462 of the strength member 20, which potentially decreases the risk that the knot 462 will become undone.

Referring now to FIGS. 22-26, an alternate embodiment of a retention member 548 for a nozzle 500 is shown. The retention member 548 includes a first end portion 550 and a second end portion 552. In one aspect of the present disclosure, the first end portion 550 is generally square shaped and defines a thru-bore 554 that extends axially through the first and second end portions 550, 552 of the retention member 548.

The second end portion 552 includes a plurality of resilient tabs 556. Each of the resilient tabs 556 includes a base end 558 that is engaged with the first end portion 550 and an oppositely disposed free end 560. In one aspect of the present disclosure, the base end 558 is integral with the first end portion 550. Each of the free ends 560 includes a protrusion 562 that extends radially outwardly from the free end 560. The protrusion 562 includes a lip 564 that is adapted to engage a face 542 of a collar 512 of the nozzle 500.

Each of the protrusions 562 includes a tapered surface 566 that tapers inwardly with respect to an insertion direction. As the retention member 548 is inserted into a retention opening 546 of the collar 512, the engagement of the tapered surface 566 and the retention opening 546 causes the resilient tabs 556 to flex inward. With the retention member 548 seated in a counter bore 568 of the retention opening 546, the resilient tabs 556 snap back or flex outwardly such that the lip 564 engages the face 542 of the collar 512. The engagement of the lip 564 of the retention member 548 and the collar 512 retains the retention member 548 in the retention opening 546.

Referring now to FIG. 24, the insertion of the fiber optic cable 12 into the retention member 548 will be described. The strength member 20 of the fiber optic cable 12 is inserted through the thru-bore 554 of the retention member 548, which is disposed in the retention opening 546 of the collar 512 of the nozzle 500. With the strength member 20 inserted through the thru-bore 554, the strength member 20 is tied to form a knot 570. The knot 570 is tied such that an outer diameter of the knot 570 is greater than an inner diameter of the thru-bore 554.

Referring now to FIG. 25, an alternate embodiment of an insert assembly 26" is shown. The insert assembly 26" includes a nozzle 600, a sleeve 604, and the retainer 106.

Referring now to FIGS. 26 and 27, the nozzle 600 includes a first axial end 608 and an oppositely disposed second axial end 610. The first and second axial ends 608, 610 include a first end surface 614 and a second end surface 616, respectively. The first and second end surfaces 614, 616 of the first and second axial ends 608, 610 are generally perpendicular to a central longitudinal axis 618 through the insert assembly 26".

The nozzle 600 defines a bore 620. The bore 620 extends through the first and second end surfaces 614, 616 of the first and second axial ends 608, 610. The bore 620 is adapted to receive the fiber optic cable 12.

The first axial end 608 includes a plurality of projections 622. Each of the plurality of projections 622 extends outwardly from the first axial end 608 in a generally radial direction. In one aspect of the present disclosure, the first axial end 608 includes a first projection 622a and a second projection 622b. In another aspect of the present disclosure, the first axial end 608 includes the first projection 622a, the second projection 622b, a third projection 622c and a fourth projection 622d.

Each of the plurality of projections 622 includes a first end face 624 and an oppositely disposed second end face 626. In one aspect of the present disclosure, the first and second end faces 624, 626 are generally perpendicular to the central longitudinal axis 618 of the inert assembly 26". Each of the plurality of projections 622 further includes a surface 628 that extends between the first and second end faces 624, 626. In one aspect of the present disclosure, the surface 628 is arcuate in shape.

The first axial end 608 defines a plurality of grooves 630. Each of the plurality of grooves 630 is disposed between adjacent projections 622. In one aspect of the present disclosure, the first axial end 608 defines a first groove 630a and a second groove 630b. In another aspect of the present disclosure, the first axial end 608 defines a first groove 630a, a second groove 630b, a third groove 630c and a fourth groove 630d with each of the grooves 630 being oriented about central longitudinal axis 618 in 90 degree increments. Each of the plurality of grooves 630 extends through the first and second end surfaces 624, 626 and includes an opening 632 disposed in the surface 628.

The second axial end 610 is generally cylindrical in shape. The second axial end 610 includes at least one tab 634 that extends outwardly from the second axial end 610 in a generally radial direction. The tab 634 is generally aligned with one of the plurality of grooves 630 of the first axial end 608. In one aspect of the present disclosure, the second axial end 610 includes two tabs 634. The tabs 634 are oppositely positioned about the second axial end 610. In one aspect of the present disclosure, the tabs 634 are about 180 degrees apart.

The tab 634 includes a first surface 636 and an oppositely disposed second surface 638. In one aspect of the present disclosure, the first and second surfaces 636, 638 are generally perpendicular to the central longitudinal axis 618. The second surface 638 is generally aligned with the second end surface 616.

The sleeve 604 is adapted to receive the nozzle 600. The sleeve 604 includes a first end portion 640 and an oppositely disposed second end portion 642. The first end portion 640 is bifurcated so that the first end portion 640 includes a first projection portion 644 and a second projection portion 646. Each of the first and second projection portions 644, 646 projects outwardly in an axial direction from a first axial end surface 648 of the first end portion 640. In one aspect of the present disclosure, the first and second projection portions 644, 646 are oppositely disposed about the central longitudinal axis 618 of the insert assembly 26".

The first end portion 640 defines a slot 650. The slot 650 is defined by the first axial end surface 648, the first projection portion 644 and the second projection portion 646. In one aspect of the present disclosure, the slot 650 bifurcates the first end portion 640.

The sleeve 604 defines an internal bore 652 that extends through the first and second end portions 640, 642. The internal bore 652 includes at least one channel 654 that extends between the first and second axial end portions 640, 642. The at least one channel 654 is adapted to receive the at least one tab 634 of the nozzle 600. In one aspect of the present disclosure, the internal bore 652 includes two channels 654 that are adapted to receive the two tabs 634 of the nozzle 600.

Referring now to FIG. 28, the second end portion 642 of the sleeve 604 includes a counter bore 656. The counter bore 656 is aligned with the internal bore 652. The counter bore 656 includes a rim 658 disposed at the interface between the counter bore 656 and the internal bore 652. The rim 658 of the counter bore 656 is formed by an internal diameter of the counter bore 656 that is greater than an internal diameter of the internal bore 652. The rim 658 defines an opening 660 to the channel 654 and a notch 662. In one aspect of the present disclosure, the rim 658 defines an opening 660 for each of two channels 654 and two notches 662.

Each of the notches 662 is adapted to receive one of the tabs 634 of the nozzle 600. In one aspect of the present disclosure, the notches 662 are symmetrically disposed between the channels 654. In another aspect of the present disclosure, each notch 662 is disposed about the central longitudinal axis 618 at an angle α relative to one of the openings 660. In one aspect of the present disclosure, the angle α is about 90 degrees. Each of the notches 662 includes a base wall 664 that is recessed in the rim 658 and sidewalls 668 that extend between the base wall 664 and the rim 658.

The rim 658 includes a ramp portion 670 disposed between the opening 660 of the channel 654 and the notch 662. In one aspect of the present disclosure, there is one ramp portion 670 disposed between each of the openings 660 and the notches 662. Each of the ramp portions 670 includes an inclined surface 672. The axial distance between the first axial end surface 648 of the first end portion 640 and the inclined surface 672 increases as the sleeve 604 is rotated about the central longitudinal axis 618 between the opening 660 and the notch 662.

Referring now to FIGS. 28 and 29, the insertion of the fiber optic cable 12 in the insert assembly 26" will be described. The fiber optic cable 12 is inserted through the bore 620 of the nozzle 600 such that the end 240 of the fiber optic cable 12 extends out the first axial end 608 of the nozzle 600.

The strength member 20 of the fiber optic cable 12 is routed from the bore 620 of the nozzle 600 through the first groove 630a, which is disposed adjacent to the first projection 622a, so that the strength member 20 is routed in the first groove 630a in a direction opposite the insertion direction 49. The strength member 20 is then routed across the second end face 626 of the first projection 622a and into the second groove 630b, which is disposed adjacent to the first projection 622a and opposite the first groove 630a, so that the strength member 20 is routed in the second groove 630b in a direction generally parallel to the insertion direction 49.

The tabs 634 of the second axial end 610 of the nozzle 600 are aligned with the channels 654 of the internal bore 652 of the sleeve 604. The sleeve 604 is then advanced over the nozzle 600 such that the tabs 634 pass through the channels 654. The sleeve 604 is advanced until the strength member 20 routed over the second end faces 626 of the projections 622 of the nozzle 600 abuts the first axial end surface 648 of the first end portion 640 of the sleeve 604. With the strength member 20 of the fiber optic cable 12 abutting the first axial end surface 648 of the first end portion 640 of the sleeve 604, the tabs 634 of the nozzle 600 are through the channels 654. The sleeve 604 is then rotated about the central longitudinal axis 618. As the sleeve 604 is rotated, the first surfaces 636 of the tabs 634 contact the inclined surfaces 672 of the ramp portions 670 of the rim 658. As the first surfaces 636 of the tabs 634 slide along the inclined surfaces 672 of the rim 658, the strength member 20 of the fiber optic cable 12 is compressed between the second end face 626 of the first projection 622a and the first axial end surface 648 of the first end portion 640 of the sleeve 604. The sleeve 604 is rotated until the tabs 634 are disposed in the notches 662. Interference between the sidewalls 668 of the notches 662 and the tabs 634 prevent inadvertent disengagement of the tabs 634 and the notches 662.

With the tabs 634 of the nozzle 600 disposed in the notches 662 of the sleeve 604, the strength member 20 of the fiber optic cable 12 is secured between the nozzle 600 and the sleeve 604. With the strength member 20 secured, the a pull-out force applied to the fiber optic cable 12 in a direction opposite the cable insertion direction 49 is transferred to the cable pass-thru fitting 14 through the engagement between the strength member 20 and the insert assembly 26". This force transfer prevents the pull-out force from acting directly on the optical fiber 16 of the fiber optic cable 12 and potentially damaging the optical fiber 16.

Referring now to FIGS. 30-31, a fiber optic access terminal, generally designated 800 is shown. The cable pass-thru fitting 14 is suitable for use in the fiber optic access terminal 800. Aspects of the fiber optic access terminal 800 have been described in U.S. patent application Ser. No. 12/332,468, entitled "WALL BOX ADAPTED TO BE MOUNTED AT MID-SPAN ACCESS LOCATION OF A TELECOMMUNICATIONS CABLE" and filed on Dec. 11, 2008, U.S. patent application Ser. No. 12/350,337, entitled "WALL BOX ADAPTED TO BE MOUNTED AT MID-SPAN ACCESS LOCATION OF A TELECOMMUNICATIONS CABLE" and filed on Jan. 8, 2009, and U.S. Patent Application Ser. No. 61/147,970, entitled "FIBER OPTIC ENCLOSURE" and filed on Jan. 28, 2009, the disclosures of which are incorporated herein by reference in their entirety.

The fiber optic access terminal 800 includes an enclosure 802. In one aspect of the present disclosure, the enclosure 802 is generally rectangular in shape. The enclosure 802 includes a first side 806 and an oppositely disposed second side 808. The enclosure 802 further includes a first end 810 and an oppositely disposed second end 812.

In one aspect of the present disclosure, the enclosure 802 includes a base 814 and a cover 816 mounted to the base 814. In one aspect of the present disclosure, the cover 816 is pivotally mounted to the base 814 by hinges 818 disposed on the first side 806 of the enclosure 802. A plurality of latches 820 is disposed on the second side 808 of the enclosure 802. The plurality of latches 820 is adapted to secure the cover 816 in a closed position relative to the base 814.

The enclosure 802 includes at least one mounting portion 822. In one aspect of the present disclosure, the mounting portion 822 is disposed on at least one of the first end 810 and the second end 812 of the enclosure 802. In another aspect of the present disclosure, each of the first and second ends 810, 812 of the enclosure 802 includes the mounting portion 822. In another aspect of the present disclosure, the mounting portions 822 are disposed on the cover 816 of the enclosure 802.

The mounting portion 822 includes a plurality of mounting openings 824. Each of the plurality of mounting openings 824 is adapted to receive the cable pass-thru fitting 14.

The base 814 and the cover 816 of the enclosure 802 cooperatively define an interior region 868. With the enclosure 802 in an open position (shown in FIGS. 30 and 31), the interior region 868 is accessible.

A first cable management tray 870 is disposed on a base panel 872 of the cover 816. The first cable management tray 870 is adapted to receive optical fibers 16 from the cable pass-thru fittings 14 and to route those optical fibers 16 to a second cable management tray 871 disposed on the first side 806 of the cover 816.

The cable management tray 870 defines an outer fiber loop 874, a first inner fiber loop 876 and a second inner fiber loop 878. In one aspect of the present disclosure, the first and second inner fiber loops 876, 878 are disposed interior to the outer fiber loop 874.

In one aspect of the present disclosure, the first and second inner fiber loops 876, 878 are formed by first and second circular protrusions 880, 882, respectively. The first and second circular protrusions 880, 882 are arranged such that the optical fibers 16 can be routed in a "figure-eight" arrangement so that the direction of the optical fiber 16 can be changed without the risk of exceeding the bend radius limit of the optical fiber 16.

A plurality of retention fingers 884 extend at least partially across the outer fiber loop 874, the first inner fiber loop 876 and the second inner fiber loop 878. The retention fingers 884 are adapted to retain the optical fibers 16 in the respective loops.

The second cable management tray 871 includes a fiber path 886. The fiber path 886 is formed by a circular protrusion 888. The fiber path 886 is adapted to route the optical fibers 16 from the first cable management tray 870 to a tray stack 900. The fiber path 886 includes a plurality of retention fingers 890 that extend at least partially across the fiber path 886.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable pass-thru assembly comprising:
   a fiber optic cable having an optical fiber and a strength member;
   a cable pass-thru fitting adapted to receive at least a portion of the fiber optic cable, the cable pass-thru fitting including:
      a housing assembly defining a bore;
      an insert assembly adapted for engagement with the housing assembly, at least a portion of the insert assembly being disposed in the bore of the housing assembly, the insert assembly including:
         a nozzle defining a cable passage through which the fiber optic cable passes; and
         a retention member engaged with the nozzle, wherein the strength member is captured between the nozzle and the retention member external of the cable passage.

2. The cable pass-thru assembly of claim 1, wherein the strength member is selected from a group consisting of yarns, fibers, threads, tapes, films, and filaments.

3. The cable pass-thru assembly of claim 1, wherein the retention member is threadedly engaged with the nozzle.

4. The cable pass-thru assembly of claim 1, wherein the retention member is a sleeve.

5. The cable pass-thru assembly of claim 4, wherein the nozzle includes an exterior surface having a plurality of threads, the sleeve including a plurality of inner threads that is adapted for engagement with the plurality of threads of the nozzle.

6. The cable pass-thru assembly of claim 5, wherein the strength member is disposed between the threads of the nozzle and the inner threads of the sleeve.

7. The cable pass-thru assembly of claim 4, wherein the nozzle includes a first axial end having a plurality of projections that extend outwardly in a generally radial direction from the first axial end.

8. The cable pass-thru assembly of claim 7, wherein the strength member is compressed between the sleeve and one of the plurality of projections.

9. The cable pass-thru assembly of claim 8, wherein the strength member is compressed between an end face of the projection and an end surface of a first end portion of the sleeve.

10. The cable pass-thru assembly of claim 1, further comprising a sealing assembly including a sealing member, wherein the sealing member provides a seal about the fiber optic cable.

11. The cable pass-thru assembly of claim 10, wherein the insert assembly includes a retainer.

12. The cable pass-thru assembly of claim 11, wherein the sealing assembly includes an end plug that is engaged with the retainer.

13. The cable pass-thru assembly of claim 1, wherein the nozzle includes a collar that extends radially outward from a first axial end portion of the nozzle.

14. The cable pass-thru assembly of claim 13, wherein the collar defines a retention opening, the retention member being engaged in the retention opening of the collar.

15. The cable pass-thru assembly of claim 14, wherein the retention member is in snap-fit engagement with the retention opening.

16. A cable pass-thru assembly comprising:
a fiber optic cable having an optical fiber and a strength member;
a cable pass-thru fitting adapted to receive at least a portion of the fiber optic cable, the cable pass-thru fitting including:
a housing assembly defining a bore;
an insert assembly adapted for engagement with the housing assembly, at least a portion of the insert assembly being disposed in the bore of the housing assembly, the insert assembly including:
a nozzle defining a cable passage through which the fiber optic cable passes, the nozzle having a first axial end and a collar that extends radially outward from the first axial end, the collar defining a retention opening external of the cable passage; and
a retention member engaged with the nozzle external of the cable passage at the retention opening, wherein the strength member is retained by the retention member.

17. The cable pass-thru assembly of claim 16, wherein the retention member defines a thru-bore having an inner diameter.

18. The cable pass-thru assembly of claim 17, wherein the strength member passes through the thru-bore of the retention member.

19. The cable pass-thru assembly of claim 18, wherein the strength member includes a knot having an outer diameter that is greater than the inner diameter of the thru-bore.

20. A cable pass-thru assembly comprising:
a fiber optic cable having an optical fiber and a strength member;
a cable pass-thru fitting adapted to receive at least a portion of the fiber optic cable, the cable pass-thru fitting including:
a housing assembly defining a bore;
an insert assembly adapted for engagement with the housing assembly, at least a portion of the insert assembly being disposed in the bore of the housing assembly, the insert assembly including:
a nozzle defining a cable passage through which the fiber optic cable passes, the nozzle having a first axial end and a collar that extends radially outward from the first axial end, the collar defining a retention opening; and
a retention member engaged with the nozzle at the retention opening, wherein the strength member is retained by the retention member;
wherein the retention member defines a thru-bore having an inner diameter; wherein the strength member passes through the thru-bore of the retention member; and wherein the strength member includes a knot having an outer diameter that is greater than the inner diameter of the thru-bore.

* * * * *